US012762189B2

(12) United States Patent
Radhakrishnan et al.

(10) Patent No.: US 12,762,189 B2
(45) Date of Patent: Oct. 13, 2026

(54) CONDITIONAL DATA SOURCING AND CURATION FOR GENERATING DATASETS IN DEEP LEARNING MODEL TRAINING

(71) Applicant: NVIDIA Corporation, Santa Clara, CA (US)

(72) Inventors: Subhashree Radhakrishnan, Milpitas, CA (US); Shijia Liao, Santa Clara, CA (US); Charul Verma, Jaipur (IN); Farzin Aghdasi, East Palo Alto, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 0 days.

(21) Appl. No.: 18/905,540

(22) Filed: Oct. 3, 2024

(65) Prior Publication Data

US 2026/0099548 A1 Apr. 9, 2026

(51) Int. Cl.
*G06F 16/9035* (2019.01)
*G06F 16/901* (2019.01)

(52) U.S. Cl.
CPC ...... *G06F 16/9035* (2019.01); *G06F 16/9024* (2019.01)

(58) Field of Classification Search
None
See application file for complete search history.

(56) References Cited

U.S. PATENT DOCUMENTS

2021/0097108 A1* 4/2021 Goyal ..................... G06F 9/323
2022/0237229 A1* 7/2022 Wong ..................... G06Q 10/06
2022/0345543 A1* 10/2022 Oleinikov ............. G06F 16/288
2023/0111864 A1* 4/2023 Thomas .................. H04L 63/20 726/1
2023/0342630 A1* 10/2023 Filoti ..................... G06N 5/022
2024/0362421 A1* 10/2024 Markov ................ G06F 40/216
2024/0378863 A1* 11/2024 Marri ................... G06V 10/774

OTHER PUBLICATIONS

Thirumuruganathan, S., Tang, N., Ouzzani, M. and Doan, A., 2020. Data Curation with Deep Learning. In EDBT (pp. 277-286). (Year: 2020).*

(Continued)

*Primary Examiner* — Umar Mian
(74) *Attorney, Agent, or Firm* — Squire Patton Boggs LLP; Sarah Mirza

(57) ABSTRACT

In various examples, a technique for performing conditional data sourcing and curation includes retrieving, by a plurality of processing nodes, a plurality of content items from one or more data sources, wherein each processing node retrieves a different subset of the plurality of content items from the one or more data sources. The technique also includes applying a first set of filters to metadata associated with the content items to generate a plurality of filtered content items. The technique further includes generating, based on a subset of the metadata associated with the filtered content items and a second set of filters, mappings between the filtered content items and text descriptions for the filtered content items and storing, based on the mappings, the filtered content items in association with the text descriptions in one or more data stores.

19 Claims, 10 Drawing Sheets

(56) References Cited

OTHER PUBLICATIONS

Schuhmann et al., “LAION-400M: Open Dataset of CLIP-Filtered 400 Million Image-Text Pairs”, Nov. 3, 2021, 5 pages, https://arxiv.org/pdf/2111.02114.

Gadre et al., “DATACOMP: In search of the next generation of multimodal datasets”, Oct. 20, 2023, 66 pages, https://arxiv.org/pdf/2304.14108.

Baack, Stefan, “Training Data for the Price of a Sandwich, Common Crawl’s Impact on Generative AI”, Mozilla, Feb. 2024, 36 pages, https://assets.mofoprod.net/network/documents/Common_Crawl_Mozilla_Foundation_2024.pdf.

* cited by examiner

CONDITIONAL DATA SOURCING AND CURATION FOR GENERATING DATASETS IN DEEP LEARNING MODEL TRAINING

TECHNICAL FIELD

Embodiments of the present disclosure relate generally to data processing and machine learning and, more specifically, to a conditional data sourcing and curation pipeline.

BACKGROUND

Software applications, machine learning models, and/or other types of technology are increasingly reliant on large-scale data to run and improve. For example, large language models, vision language models, and/or other types of "foundation" machine learning models may be trained on vast datasets of text and/or other types of content and include large numbers of parameters that allow the LLMs to learn complex patterns in the content. After pre-training of an LLM is complete, the LLM is capable of using the same types of content to perform a wide range of tasks. In another example, an online platform may use large datasets of user interactions, viewing histories, and/or purchase records to provide personalized content, recommendations, and/or user experiences. In a third example, an autonomous vehicle may operate using control systems and/or machine learning models that are developed and/or trained using vast amounts of sensor data such as (but not limited to) camera footage, LiDAR scans, map data, and/or telemetry data. In a fourth example, large-scale genetic and health data from hundreds of thousands of individuals may be used to train machine learning models for use in disease prediction, drug discovery, and/or personalized medicine.

However, existing techniques for collecting data are associated with a number of limitations that interfere with the effective generation of large-scale datasets. First, existing large-scale datasets are typically created by collecting content from the Internet without additional filters or checks. As a result, data in these large-scale datasets may include a large amount of duplicated content, and may also vary in quality and/or relevance to a given application or task. Second, conventional solutions for retrieving data typically provide predefined filters for the data, which limits the customizability of the data retrieval process. These solutions may also be inaccurate (e.g., retrieved data does not actually meet the corresponding criteria and/or filters) and/or unable to retrieve large volumes of data.

As such, a need exists for more effective techniques for retrieving and processing large volumes of data.

SUMMARY

Embodiments of the present disclosure relate to a conditional data sourcing and curation pipeline. The techniques described herein include retrieving, by a plurality of processing nodes, a plurality of content items from one or more data sources, wherein each processing node included in the plurality of processing nodes retrieves a different subset of the plurality of content items from the one or more data sources. The techniques also include applying a first set of filters to metadata associated with the plurality of content items to generate a plurality of filtered content items, wherein the first set of filters comprises a set of conditions associated with the metadata. The techniques further include generating, based on a subset of the metadata associated with the plurality of filtered content items and a second set of filters, a plurality of mappings between the plurality of filtered content items and a plurality of text descriptions for the plurality of filtered content items and storing, based on the plurality of mappings, the plurality of filtered content items in association with the plurality of text descriptions in one or more data stores.

One technical advantage of the disclosed techniques relative to prior approaches is the ability to retrieve and process large volumes of data in a scalable, efficient, and fault-tolerant manner via a set of distributed processing nodes. Consequently, the disclosed techniques may handle larger volumes of data and/or retrieve data more quickly than conventional approaches that lack the ability to configure, execute, and/or restart processing nodes in an independent manner. Another technical advantage of the disclosed techniques is the ability to generate large-scale datasets that are balanced and that meet various conditions and/or constraints. Accordingly, datasets generated via the disclosed techniques may be higher quality and/or more relevant to the corresponding use cases than datasets generated via conventional techniques. Further, machine learning models, applications, and/or other technologies that use and/or incorporate these datasets may be more accurate, compliant, and/or performant than technologies that use large-scale data generated via conventional approaches.

BRIEF DESCRIPTION OF THE DRAWINGS

The present systems and methods for a conditional data sourcing and curation pipeline are described in detail below with reference to the attached drawing figures, wherein.

DETAILED DESCRIPTION

Figure 1:
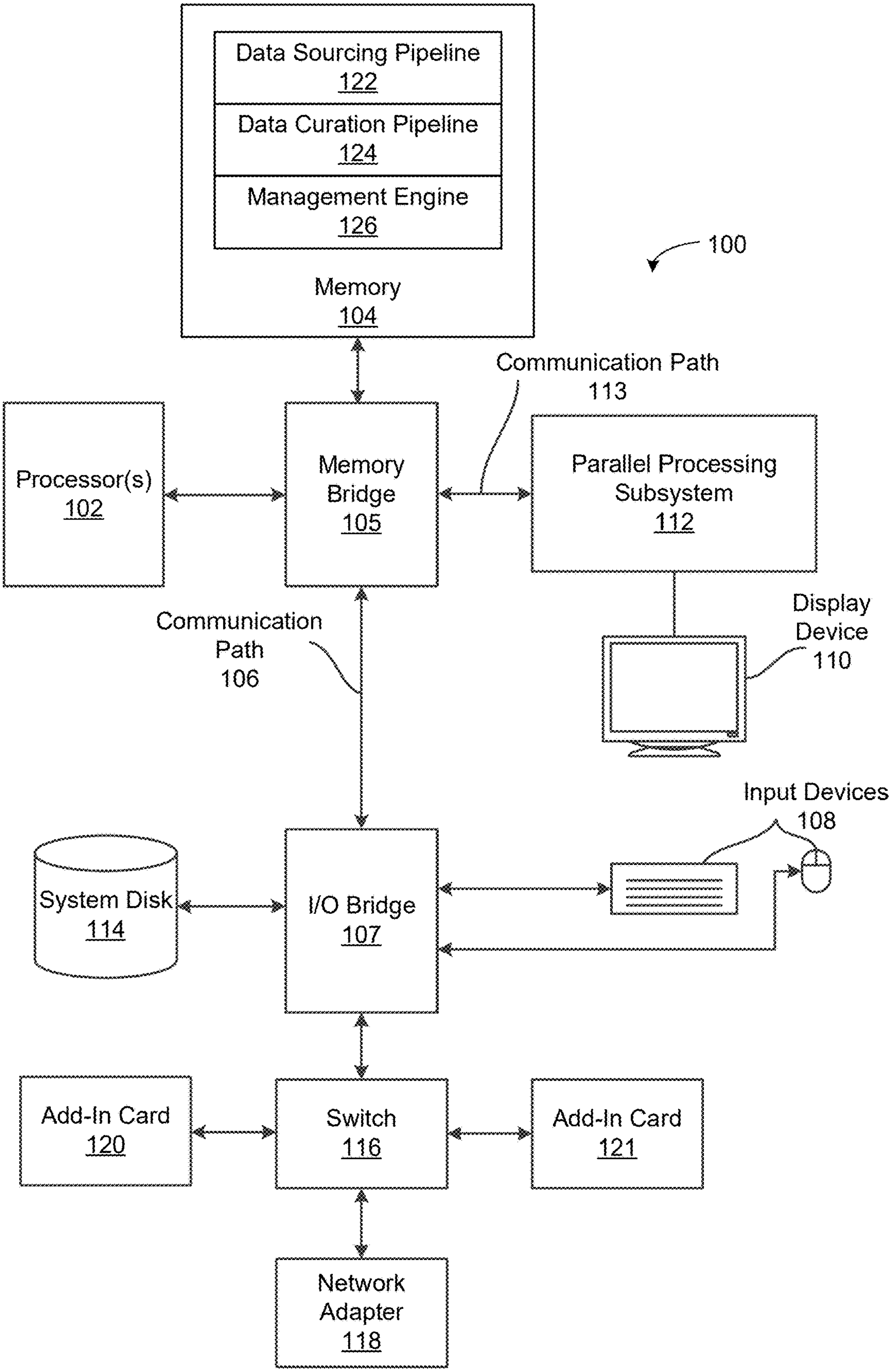
FIG. 1 illustrates a block diagram of a computing system configured to implement one or more aspects of at least one embodiment.

Systems and methods are disclosed related to a conditional data sourcing and curation pipeline.

As discussed herein, technologies such as software applications, autonomous vehicles, and/or machine learning models are increasingly reliant on large volumes of data. However, existing techniques for collecting large-scale datasets can be inaccurate, unable to scale to sufficient volumes of data, and/or limited in customizability to various use cases and/or criteria.

To address the above limitations, the disclosed techniques provide a conditional data sourcing and curation pipeline that is used to generate a dataset of content that is targeted to a specific use case or set of use cases. One or more embodiments of the present disclosure include an implementation of the pipeline that includes a distributed architecture with multiple independent processing nodes to retrieve content items from various data sources. For example, one or more tasks performed by the pipeline may include configuring the processing nodes to retrieve content such as (but not limited to) images, video, audio, text, three-dimensional (3D) content, and/or multimodal content from data sources such as (but not limited to) the Internet, a set of websites, one or more archives, one or more filesystems, and/or one or more databases. Each processing node is configured to operate independently on a different subset of content items and can be restarted after experiencing an error or failure without affecting other processing nodes. When a processing node is restarted, the processing node is configured to continue retrieving content items from the corresponding subset of content without re-retrieving previously retrieved content items.

The pipeline may also perform one or more tasks that apply a first set of customizable filters to metadata associated with the retrieved content items to tailor the retrieved content to the corresponding use case(s). For example, the filters may include (but are not limited to) keywords, categories, deduplication filters, and/or usage filters (e.g., restrictions on the use of the content items) associated with data sources for the content items and/or the content items. The filters may be used to exclude certain data sources and/or content items from the dataset and/or include certain data sources and/or content items in the dataset.

The pipeline may also perform one or more tasks that apply a second set of customizable filters to (i) filtered content items that pass the first set of filters and (ii) text descriptions paired with the filtered content items. For example, the pipeline may pair each filtered content item with a text description that is obtained from an "alt" attribute associated with the filtered content item, a title of a webpage that includes and/or links to the filtered content item, and/or another source of metadata for the filtered content item. The pipeline may also use a set of machine learning models to generate (i) embeddings of the filtered content items and/or text descriptions and (ii) scores representing predictions of appropriateness, relevance, similarity, and/or other attributes associated with the filtered content items and/or text descriptions. The pipeline may compare the scores with corresponding thresholds in the second set of customizable filters and update the filtered content items and/or text descriptions based on the results of the comparisons. These thresholds may be used to remove unsafe and/or inappropriate content, replace text descriptions that are irrelevant to the corresponding content items with more relevant text descriptions, and/or perform other tasks related to the filtered content items and/or text descriptions. The updated filtered content items and/or text descriptions may then be used to train a machine learning model, execute an application, and/or perform another task associated with a corresponding use case.

One technical advantage of the disclosed techniques relative to prior approaches is the ability to retrieve and process large volumes of data in a scalable, efficient, and fault-tolerant manner via a set of distributed processing nodes. Consequently, the disclosed techniques may handle larger volumes of data and/or retrieve data more quickly than conventional approaches that lack the ability to configure, execute, and/or restart processing nodes in an independent manner. Another technical advantage of the disclosed techniques is the ability to generate large-scale datasets that are balanced and that meet various conditions and/or constraints. Accordingly, datasets generated via the disclosed techniques may be higher quality and/or more relevant to the corresponding use cases than datasets generated via conventional techniques. Further, machine learning models, applications, and/or other technologies that use and/or incorporate these datasets may be more accurate, compliant, and/or performant than technologies that use large-scale data generated via conventional approaches.

The above examples are not in any way intended to be limiting. As persons skilled in the art will appreciate, as a general matter, the techniques for performing conditional data sourcing and curation can be implemented in and/or used with any suitable application.

The systems and methods described herein may be used for a variety of purposes, by way of example and without limitation, for use in systems associated with machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, data center processing, conversational AI, generative AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., an infotainment or plug-in gaming/streaming system of an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implemented at least partially in a data center, systems for performing conversational AI operations, systems implementing one or more language models-such as LLMs/VLMs/multi-modal language models/other model types that may process text, audio, 3D data, and/or image data, systems for performing light transport simulation, systems for performing collaborative content creation for 3D assets, systems implemented at least partially using cloud computing resources, systems for performing generative AI operations, and/or other types of systems.

System Overview

FIG. 1 is a block diagram illustrating a computing system 100 configured to implement one or more aspects of at least one embodiment. In at least one embodiment, computing system 100 may include any type of computing device, including, without limitation, a server machine, a server platform, a desktop machine, a laptop machine, a hand-held/ mobile device, a digital kiosk, an in-vehicle infotainment system, a smart speaker or display, a television, and/or a wearable device. In at least one embodiment, computing system 100 is a server machine operating in a data center or a cloud computing environment that provides scalable computing resources as a service over a network.

In various embodiments, computing system 100 includes, without limitation, one or more processors 102 and one or more memories 104 coupled to a parallel processing subsystem 112 via a memory bridge 105 and a communication path 113. Memory bridge 105 is further coupled to an I/O (input/output) bridge 107 via a communication path 106, and I/O bridge 107 is, in turn, coupled to a switch 116.

In one embodiment, I/O bridge 107 is configured to receive user input information from optional input devices 108, such as (but not limited to) a keyboard, mouse, touch screen, sensor data analysis (e.g., evaluating gestures, speech, or other information about one or more uses in a field of view or sensory field of one or more sensors), a VR/MR/AR headset, a gesture recognition system, a steering wheel, mechanical, digital, or touch sensitive buttons or input components, and/or a microphone, and forward the input information to processor(s) 102 for processing. In at least one embodiment, computing system 100 may be a server machine in a cloud computing environment. In such embodiments, computing system 100 may omit input devices 108 and receive equivalent input information as commands (e.g., responsive to one or more inputs from a remote computing device) and/or messages transmitted over a network and received via the network adapter 118. In at least one embodiment, switch 116 is configured to provide connections between I/O bridge 107 and other components of computing system 100, such as a network adapter 118 and various add-in cards 120 and 121.

In at least one embodiment, I/O bridge 107 is coupled to a system disk 114 that may be configured to store content and applications and data for use by processor(s) 102 and parallel processing subsystem 112. In one embodiment, system disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high-definition DVD), or other magnetic, optical, or solid-state storage devices. In various embodiments, other components, such as universal serial bus or other port connections, compact disc drives, digital versatile disc drives, film recording devices, and the like, may be connected to I/O bridge 107 as well.

In various embodiments, memory bridge 105 may be a Northbridge chip, and I/O bridge 107 may be a Southbridge chip. In addition, communication paths 106 and 113, as well as other communication paths within computing system 100, may be implemented using any technically suitable protocols, including, without limitation, AGP (Accelerated Graphics Port), HyperTransport, or any other bus or point-to-point communication protocol known in the art.

In at least one embodiment, parallel processing subsystem 112 includes a graphics subsystem that delivers pixels to an optional display device 110 that may be any conventional cathode ray tube, liquid crystal display, light-emitting diode display, and/or the like. In such embodiments, parallel processing subsystem 112 may incorporate circuitry optimized for graphics and video processing, including, for example, video output circuitry. Such circuitry may be incorporated across one or more parallel processing units (PPUs), also referred to herein as parallel processors, included within the parallel processing subsystem 112.

In at least one embodiment, parallel processing subsystem 112 incorporates circuitry optimized (e.g., that undergoes optimization) for general purpose and/or compute processing. Again, such circuitry may be incorporated across one or more PPUs included within parallel processing subsystem 112 that are configured to perform such general purpose and/or compute operations. In yet other embodiments, the one or more PPUs included within parallel processing subsystem 112 may be configured to perform graphics processing, general purpose processing, and/or compute processing operations. Memor(ies) 104 include at least one device driver configured to manage the processing operations of the one or more PPUs within parallel processing subsystem 112. In addition, memor(ies) 104 include a data sourcing pipeline 122, a data curation pipeline 124, and a management engine 126, which can be executed by processor(s) and/or parallel processing subsystem 112.

In various embodiments, parallel processing subsystem 112 may be integrated with one or more of the other elements of FIG. 1 to form a single system. For example, parallel processing subsystem 112 may be integrated with processor(s) 102 and other connection circuitry on a single chip to form a system on a chip (SoC).

Processor(s) 102 may include any suitable processor implemented as a central processing unit (CPU), a graphics processing unit (GPU), an application-specific integrated circuit (ASIC), a field programmable gate array (FPGA), an artificial intelligence (AI) accelerator, a deep learning accelerator (DLA), a parallel processing unit (PPU), a data processing unit (DPU), a vector or vision processing unit (VPU), a programmable vision accelerator (PVA) (which may include one or more VPUs and/or direct memory access (DMA) systems), any other type of processing unit, or a combination of different processing units, such as a CPU(s) configured to operate in conjunction with a GPU(s). In general, processor(s) 102 may include any technically feasible hardware unit capable of processing data and/or executing software applications. Further, in the context of this disclosure, the computing elements shown in computing system 100 may correspond to a physical computing system (e.g., a system in a data center or a machine) and/or may correspond to a virtual computing instance executing within a computing cloud.

In at least one embodiment, processor(s) 102 issue commands that control the operation of PPUs. In at least one embodiment, communication path 113 is a PCI Express link, in which dedicated lanes are allocated to each PPU. Other communication paths may also be used. The PPU advantageously implements a highly parallel processing architecture, and the PPU may be provided with any amount of local parallel processing memory (PP memory).

It will be appreciated that the system shown herein is illustrative and that variations and modifications are possible. The connection topology, including the number and arrangement of bridges, the number of processors 102, and the number of parallel processing subsystems 112, may be modified as desired. For example, in at least one embodiment, memor(ies) 104 may be connected to processor(s) 102 directly rather than through memory bridge 105, and other devices may communicate with memor(ies) 104 via memory bridge 105 and processors 102. In other embodiments, parallel processing subsystem 112 may be connected to I/O bridge 107 or directly to processor(s) 102, rather than to memory bridge 105. In still other embodiments, I/O bridge 107 and memory bridge 105 may be integrated into a single chip instead of existing as one or more discrete devices. In certain embodiments, one or more components shown in FIG. 1 may not be present. For example, switch 116 may be eliminated, and network adapter 118 and add-in cards 120, 121 would connect directly to I/O bridge 107. Lastly, in certain embodiments, one or more components shown in FIG. 1 may be implemented as virtualized resources in a virtual computing environment, such as a cloud computing environment. In particular, the parallel processing subsystem 112 may be implemented as a virtualized parallel processing subsystem in at least one embodiment. For example, the parallel processing subsystem 112 may be implemented as a virtual graphics processing unit(s) (vGPU(s)) that renders graphics on a virtual machine(s) (VM(s)) executing on a server machine(s) whose GPU(s) and other physical resources are shared across one or more VMs.

Conditional Data Sourcing and Curation Pipeline

Figure 2:
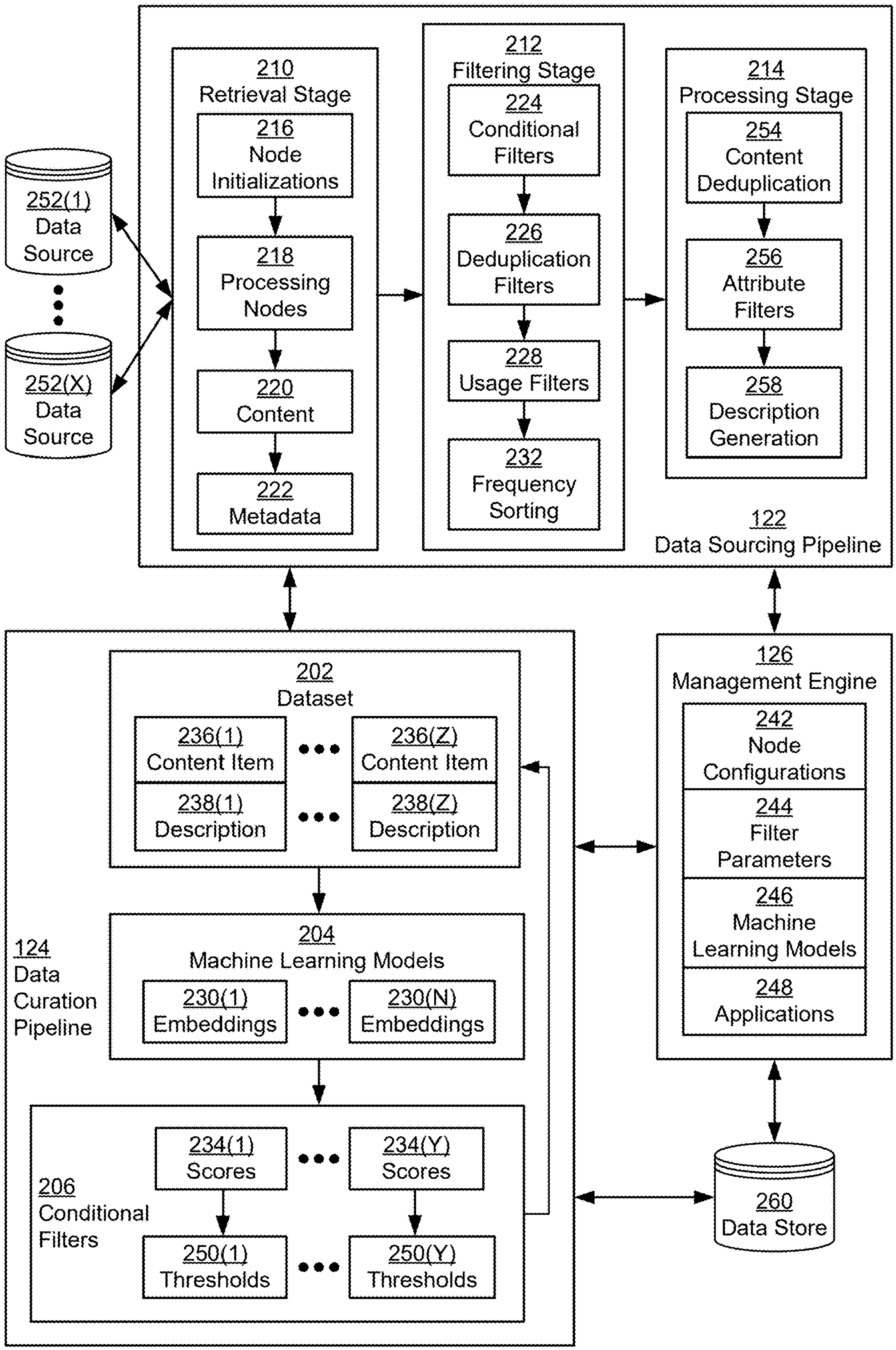
FIG. 2 is a more detailed illustration of the data sourcing pipeline, data curation pipeline, and management engine of FIG. 1, according to at least one embodiment.

FIG. 2 is a more detailed illustration of data sourcing pipeline 122, data curation pipeline 124, and management engine 126 of FIG. 1, according to at least one embodiment. In some embodiments, data sourcing pipeline 122, data curation pipeline 124, and management engine 126 include functionality to generate and/or use a dataset of content in a manner that is targeted to a specific use case or set of use cases. Each of these components is described in further detail below.

Data sourcing pipeline 122 generates a dataset 202 of content items 236(1)-236(Z) (each of which is referred to individually herein as content item 236) paired with corresponding descriptions 238(1)-238(Z)) (each of which is referred to individually herein as description 238). Each content item 236 may include (but is not limited to) image content, audio, video, text, three-dimensional (3D) content (e.g., computer aided design (CAD) data, 3D scans, USD data (e.g., for NVIDIA's OMNIVERSE or other collaborative content generation/sharing/interactive platforms, etc.), biomedical content, sensor data, medical data, and/or multimodal content.

Each description 238 includes text (or another type of data) that describes a corresponding content item 236. For example, a given content item 236 of an image may include a corresponding description 238 of a scene, object, named entity, action, location, mood, color, style, and/or another attribute depicted in the image.

More specifically, data sourcing pipeline 122 includes multiple stages that are executed to generate dataset 202. During a retrieval stage 210, data sourcing pipeline 122 performs node initializations 216 of multiple processing nodes 218 and uses these processing nodes 218 to retrieve content 220 and/or metadata 222 associated with content 220 from a set of data sources 252(1)-252(X) (each of which is referred to individually herein as data source 252). For example, processing nodes 218 may include physical machines, virtual machines, applications, processes, and/or other entities that are capable of performing data retrieval and/or processing. These processing nodes 218 may be distributed across one or more clusters, grids, data centers, networks, and/or other types of environments and/or platforms.

Each processing node 218 retrieves a subset of content 220 and/or corresponding metadata 222 from one or more websites, archives, databases, filesystems, and/or other types of data sources 252. For example, each processing node 218 may parse the content of webpages from one or more websites to identify images, videos, documents, and/or other types of content 220 that is included in and/or linked within the webpages. Each processing node 218 may also associate the identified content 220 with the text of the corresponding webpage, website, and/or another source of metadata 222 for content 220.

During node initializations 216, data sourcing pipeline 122 specifies data sources 252 from which content 220 is to be retrieved; one or more types of content 220 and/or metadata 222 to be retrieved from data sources 252; data formats, fields, and/or file extensions associated with content 220 and/or metadata 222 to be retrieved from data sources 252; and/or other retrieval criteria that can be used to control the retrieval of content 220 and/or metadata 222 by processing nodes 218. For example, data sourcing pipeline 122 may initialize multiple processing nodes 218 using the same retrieval criteria, so that these processing nodes 218 perform the same and/or similar types of data retrieval and/or processing tasks. Data sourcing pipeline 122 may also, or instead, use different sets of retrieval criteria to initialize different processing nodes 218 and/or different subsets of processing nodes 218, so that processing nodes 218 are capable of performing data retrieval and/or processing in different ways.

In some embodiments, node initializations 216 are used to configure each processing node 218 to independently retrieve different subsets of content 220 from data sources 252. For example, data sourcing pipeline 122 may use a sharding technique to assign disjoint subsets of content 220 to different processing nodes 218 based on criteria such as (but not limited to) identifiers and/or locations of data sources 252 (e.g., Uniform Resource Locators (URLs) and/or network addresses of websites on the Internet), timestamps associated with data sources 252, indexes and/or identifiers associated with individual content items 236 included in content 220, and/or other types of retrieval criteria. In configuring processing nodes 218 to operate independently from one another, data sourcing pipeline 122 reduces bandwidth consumption by individual processing nodes 218 and avoids synchronization across processing nodes 218.

Data sourcing pipeline 122 also, or instead, includes functionality to detect and/or manage failures in individual processing nodes 218 in a way that does not affect the operation of other processing nodes 218. For example, data sourcing pipeline 122 may include a monitoring component that runs on each processing node. The monitoring component may periodically and/or continuously check for error codes that represent crashes and/or other types of failures on the corresponding processing node. The monitoring component may also track the progress of the corresponding processing node in retrieving content 220 and/or metadata 222 from one or more data sources 252 (e.g., the number of content items 236 and/or pieces of metadata 222 retrieved by the processing node, the status of retrieving a given content item 236 and/or corresponding metadata 222, etc.). When the monitoring component detects a failure in the corresponding processing node, the monitoring component reinitializes the processing node so that the processing node can resume retrieval of remaining content 220 and/or metadata 222 assigned to the processing node instead of restarting the retrieval process from the beginning.

Data sourcing pipeline 122 also performs a filtering stage 212 that applies a series of filters to the retrieved content 220 and/or metadata 222. Filtering stage 212 may be performed by individual processing nodes 218 and/or other components as content 220 and/or metadata 222 are retrieved (e.g., once a certain "batch" of content 220 and/or metadata 222 has been retrieved), after retrieval of content 220 and/or metadata 222 is complete, and/or on another basis.

During filtering stage 212, data sourcing pipeline 122 applies a set of conditional filters 224 to content 220 and/or metadata 222. These conditional filters 224 may specify conditions associated with the generation of dataset 202. For example, conditional filters 224 may specify values and/or ranges of values for keywords, categories, topics, themes, sentiments, named entities, actions, and/or other types of criteria that can be used to include content 220 and/or metadata 222 in dataset 202 and/or exclude content 220 and/or metadata 222 from dataset 202. These conditional filters 224 may be applied to individual content items 236 and/or corresponding metadata 222, locations of content items 236 and/or metadata 222 (e.g., websites, webpages, directories, etc.) in data sources 252, and/or other groupings of content items 236 and/or metadata 222.

Data sourcing pipeline 122 also, or instead, applies a set of deduplication filters 226 to content 220 and/or metadata 222. For example, data sourcing pipeline 122 may deduplicate URLs, paths, and/or other representations of websites, webpages, directories, and/or other locations and/or groupings of content 220 and/or metadata 222.

Data sourcing pipeline 122 also, or instead, applies a set of usage filters 228 to content 220 and/or metadata 222. In some embodiments, usage filters 228 are associated with potential restrictions on usage of content 220 and/or metadata. For example, usage filters 228 may specify conditions related to access permissions, licenses, regulations, copyrights (or other types of intellectual property), robots. txt parameters and/or fields, and/or data privacy. Like conditional filters 224, conditions specified in usage filters 228 may be used to include the corresponding content 220 and/or metadata 222 in dataset 202 and/or exclude the corresponding content 220 and/or metadata 222 from dataset 202.

Data sourcing pipeline 122 also, or instead, performs frequency sorting 232 associated with content 220 and/or metadata 222. For example, data sourcing pipeline 122 may sort websites, webpages, directories, and/or other locations and/or groupings of content 220 and/or metadata 222 by descending frequency of URLs and/or other representations of individual content items 236.

After filtering stage 212 has been used to process some or all content 220 and/or metadata 222, data sourcing pipeline 122 uses processing nodes 218 and/or other components to perform a processing stage 214 that converts the filtered and/or sorted content 220 and/or metadata 222 into pairs of content items 236 and descriptions 238 in dataset 202. During processing stage 214, data sourcing pipeline 122 performs content deduplication 254 associated with content 220 and/or metadata 222. For example, data sourcing pipeline 122 may use hash-based Bloom filters to deduplicate URLs (or other representations) of content items 236 included in content 220.

Data sourcing pipeline 122 also applies a set of attribute filters 256 to the deduplicated content 220. In some embodiments, attribute filters 256 are related to non-semantic attributes of content 220. For example, attribute filters 256 may specify conditions related to file sizes, image resolutions, bit rates, and/or other types of data-oriented attributes associated with content 220. As with conditional filters 224 and usage filters 228, attribute filters 256 may be used to include the corresponding content 220 and/or metadata 222 in dataset 202 and/or exclude the corresponding content 220 and/or metadata 222 from dataset 202.

Data sourcing pipeline 122 additionally performs description generation 258 that generates descriptions 238 of content items 236 that pass attribute filters 256. For example, data sourcing pipeline 122 may associate a given content item 236 with a corresponding description 238 that includes the text of an "alt" attribute for that content item 236, the title of a webpage that links to and/or includes that content item 236, and/or other metadata 222 associated with that content item 236. After description generation 258 has been performed for a given content item 236, data sourcing pipeline 122 may add that content item 236 and the corresponding description 238 to dataset 202 (e.g., by storing that content item 236 and description 238 in a database, index, and/or another data store corresponding to dataset 202).

Data curation pipeline 122 performs additional curation of content items 236 and/or descriptions 238 in dataset 202. More specifically, data curation pipeline 122 uses one or more machine learning models 204 to generate embeddings 230(1)-230(N) (each of which is referred to individually herein as embedding 230) of content items 236 and/or descriptions 238. For example, machine learning models 204 may include deep neural networks (DNNs), convolutional neural networks (CNNs), transformer neural networks, and/or other types of neural network and/or machine learning architectures that are capable of converting images, text, audio, video, sensor data, multidimensional data, and/or other types of content items 236 into corresponding embeddings 230 in a lower-dimensional latent space. These machine learning models 204 may be deployed on processing nodes 218, using an NVIDIA TensorRT framework, and/or using other components and/or environments.

Data curation pipeline 122 also, or instead, uses one or more machine learning models 204 to generate scores 234(1)-234(Y) (each of which is referred to individually herein as score 234) related to content items 236, descriptions 238, and/or embeddings 230. For example, machine learning models 204 may include neural networks, regression models, support vector machines (SVMs), tree-based models, and/or other types of model architectures that are capable of converting various types of content items 236 into scores 234 that represent probabilities, values, measures of relevance, and/or other numeric values related to attributes associated with content items 236, descriptions 238, and/or embeddings 230. These attributes may include (but are not limited to) classes, topics, categories, objects, sentiments, and/or other types of information that can be found in and/or associated with content items 236 and/or descriptions 238. These attributes may also, or instead, include similarities and/or other types of relationships between content items 236 and the corresponding descriptions 238, between pairs of descriptions 238, between pairs of content items 236, and/or between and/or among other groupings of content items 236 and/or descriptions 238. Machine learning models that can be used to generate embeddings 230, scores 234, and/or other output related to content items 236 and/or descriptions 238 are described in further detail below with respect to FIGS. 4-6C.

Data curation pipeline 124 applies a set of conditional filters 206 to embeddings 230 and/or scores 234 to further filter and/or process content items 236 and/or descriptions 238 in dataset 202. As shown in FIG. 2, conditional filters 206 include a set of thresholds 250(1)-250(Y) (each of which is referred to individually herein as threshold 250) associated with scores 234. When a set of one or more scores 234 meets one or more corresponding thresholds 250 (or does not meet one or more corresponding thresholds 250), data curation pipeline 124 includes one or more content items 236 and/or descriptions 238 associated with that set of scores 234 in dataset 202, excludes the content item(s) 236 and/or description(s) 238 from dataset 202, modifies the content item(s) 236 and/or description(s) 238, and/or otherwise updates content item(s) 236, description(s) 238, and/or dataset 202.

In some embodiments, conditional filters 206 are used to exclude inappropriate, sensitive, and/or otherwise restricted content from dataset 202. For example, scores 234 may include predicted probabilities that content items 236 and/or descriptions 238 belong to one or more "unsafe" categories. These scores 234 may be compared to corresponding thresholds 250 to determine if the corresponding content items 236 and/or descriptions 238 exceed a certain probability of being unsafe. When one or more scores 234 associated with a given content item 236 and/or description 238 meet or exceed one or more corresponding thresholds 250 representing unsafe content, that content item 236 and description 238 may be removed and/or omitted from dataset 202.

Conditional filters 206 are also, or instead, used to update descriptions 238 of content items 236. For example, scores 234 may include measures of similarity between content items 236 and the corresponding descriptions 238. These scores 234 may be computed between embeddings 230 of content items 236 and embeddings of the corresponding descriptions 238 (e.g., as measures of vector similarity and/or distance), by one or more machine learning models 204 (e.g., based on input that includes representations of content items 236 and the corresponding descriptions 238), and/or using another technique. These scores 234 may be compared to one or more corresponding thresholds 250 to determine if the corresponding pairs of content items 236 and descriptions 238 meet a threshold level of similarity. When a given score 234 between a content item 236 and a corresponding description 238 does not meet a corresponding threshold of similarity, data curation pipeline 124 may replace that description 238 with an alternative description that is generated via a multimodal language model (e.g., based on input that includes that content item 236), a human annotator, and/or another technique. Once description 238 has been updated, data curation pipeline 124 may generate additional embeddings 230 and/or scores 234 associated with the updated description 238, apply conditional filters 206 to the generated embeddings 230 and/or scores, and/or otherwise update dataset 202 based on the updated description 238.

In one or more embodiments, data sourcing pipeline 122 and/or data curation pipeline 124 use large language models (LLMs), vision language models (VLMs), multimodal language models, classifiers, and/or other types of machine learning models to implement conditional filters 206 and/or 224, deduplication filters 226, usage filters 228, attribute filters 256, and/or other types of filters and/or processing associated with content items 236, descriptions 238, metadata 222, and/or dataset 202. For example, data sourcing pipeline 122 and/or data curation pipeline 124 may input, into a language model, a content item, a description of a content item, and/or an instruction to apply one or more filters to the content item and/or description. Data sourcing pipeline 122 and/or data curation pipeline 124 may use the language model to generate a score, formatted data, and/or other output indicating whether or not the content item and/or description meet one or more conditions specified in the filter(s). Data sourcing pipeline 122 and/or data curation pipeline 124 may then update the content item, description, and/or dataset 202 based on the output using the techniques described above.

Data sourcing pipeline 122 and/or data curation pipeline 124 may also, or instead, use other techniques to apply various filters and/or processing to content items 236, descriptions 238, metadata 222, and/or dataset 202. For example, data sourcing pipeline 122 and/or data curation pipeline 124 may use human annotators, natural language processing techniques, rules, heuristics, and/or other techniques to filter and/or update content items 236, descriptions 238, metadata 222, and/or dataset 202 based on the semantic content of content items 236, descriptions 238, and/or metadata 222 and/or data-oriented attributes of content items 236, descriptions 238, and/or metadata 222.

Management engine 126 coordinates the operation of data sourcing pipeline 122 and data curation pipeline 124 in generating and curating pairs of content items 236 and corresponding descriptions 238 in dataset 202. As shown in FIG. 2, management engine 126 generates a set of node configurations 242 that are used to perform node initializations 216 of processing nodes 218 during retrieval stage 210. For example, management engine 126 may generate node configurations 242 based on retrieval criteria specified via one or more user interfaces, files, and/or other sources of data. Each node configuration may be used to configure the operation of a corresponding processing node in retrieving and/or processing content 220 and/or metadata 222 associated with one or more data sources 152.

Management engine 126 also generates and/or determines filter parameters 244 associated with conditional filters 206 and/or 224, deduplication filters 226, usage filters 228, attribute filters 256, and/or other types of filters that are applied to content items 236 and/or descriptions 238. For example, management engine 126 may receive filter parameters 244 via one or more user interfaces, files, and/or other sources of data. These filter parameters 244 may include values associated with the filters, instructions for applying the filters, thresholds 250 associated with the filters, actions to be performed based on the filters, and/or other information that can be used to implement and/or apply the filters. Management engine 126 may also, or instead, use machine learning models, optimization techniques, and/or other techniques to set and/or adjust one or more filter parameters 244 based on requirements associated with dataset 202 and/or one or more corresponding use cases, user feedback and/or other outcomes related to existing content items 236 and/or descriptions 238 in dataset 202, and/or other criteria. After a given filter parameter has been adjusted, management engine 126 may use data sourcing pipeline 122 and/or data curation pipeline 124 to apply the corresponding filter to content items 236, descriptions 238, and/or metadata 222, thereby updating and/or refining dataset 202 based on the filter parameter.

After dataset 202 is generated and/or stored in data store 260, management engine 126 uses dataset 202 with one or more machine learning models 246 and/or applications 248. For example, management engine 126 may use content items 236 and descriptions 238 to train a large language model, vision language model, multimodal language model, variational autoencoder, transformer neural network, diffusion model, classifier, regression model, and/or another type of machine learning model. Management engine 126 may also, or instead, use the trained machine learning model to generate predictions, new content, and/or other types of output related to content items 236 and/or descriptions 238. Management engine 126 may also, or instead, use Retrieval-Augmented Generation (RAG) to supplement a prompt to a generative model with relevant external information, such as (but not limited to) content items 236 and descriptions 238 in dataset 202. Because content items 236 and descriptions 238 in dataset 202 meet various filters and/or conditions associated with the use case for the machine learning model, the machine learning model may perform better than machine learning models that are trained and/or executed using datasets that are generated by aggregating large volumes of data without filtering and/or curating the data.

In another example, dataset 202 may include content items 236 that represent products, services, movies, courses, companies, and/or other entities. Descriptions 238 of these entities may include reviews, ratings, and/or other types of user feedback for the entities. Management engine 126 may use a collaborative filtering technique, machine learning model, and/or another type of data analysis technique to determine patterns and/or relationships related to the entities and/or user feedback. Management engine 126 may additionally use the determined patterns and/or relationships to generate recommendations of various entities to users (e.g., within one or more applications 248)

In a third example, dataset 202 may include content items 236 that represent screens, workflows, and/or other elements of user interfaces in one or more applications 248. Descriptions 238 of these user interface elements may include actions taken by the user using the user interface elements, the amount of time spent interacting with a given user interface element, and/or other information that can be used to characterize interactions between users and the user interface elements. Management engine 126 may use a machine learning model and/or another technique to identify frequent and/or important user interactions, user interactions that are associated with streamlined user experiences (e.g., user interactions that result in completion of one or more corresponding tasks in an expedient and/or efficient manner), user interactions that are associated with suboptimal user experiences (e.g., user interactions related to tasks that take a long time and/or a significant amount of trial and error to complete), and/or other characteristics related to use of the user interface(s) by users. Management engine 126 may also provide these characteristics to designers, developers, and/or other users involved in creating the user interface(s) to facilitate subsequent updates and/or improvements to the user interface(s). Management engine 126 may also, or instead, use machine learning models and/or other techniques to automatically generate updates to various elements of the user interface(s) based on the identified characteristics.

In a fourth example, dataset 202 may include content items 236 corresponding to dermatological images (or other types of biomedical and/or medical data), and descriptions 238 may identify various diseases, conditions, symptoms, demographic attributes, and/or states associated with the images. Content items 236 and descriptions 238 may be used to conduct studies and/or experiments related to the diseases, conditions, and/or states; generate course materials and/or other types of teaching content for a course on dermatology; and/or retrieve images that are similar to a user-provided image and/or for use in comparing with the user-provided image.

While the operation of data sourcing pipeline 122, data curation pipeline 124, and management engine 126 has been discussed above with respect to a specific ordering of stages and/or operations within each stage, it will be appreciated that data sourcing pipeline 122, data curation pipeline 124, and/or management engine 126 may generate and/or filter dataset 202 using a different set of stages, a different set of operations within each stage, a different ordering of stages, and/or a different ordering of operations within each stage. For example, conditional filters 206 and/or 224, deduplication filters 226, usage filters 228, attribute filters 256, and/or other types of filters may be omitted, reordered, added, and/or modified within data sourcing pipeline 122 and/or data curation pipeline 124. In another example, data sourcing pipeline 122 and data curation pipeline 124 may be merged into the same pipeline and/or divided into additional pipelines that are used to retrieve, process, and/or filter content 220 and/or metadata 222 for use with one or more use cases. In a third example, data sourcing pipeline 122, data curation pipeline 124, and/or other pipelines used to retrieve, process, and/or filter data may execute in parallel and/or sequentially to generate and/or update content items 236 and/or descriptions 238 in dataset 202.

It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. For example, in some embodiments, the system and methods described herein may be implemented using one or more generative language models (e.g., as described in FIGS. 6A-6C), one or more computing devices (e.g., as described in FIG. 7), and/or one or more data centers (e.g., as described in FIG. 8).

Figure 3:
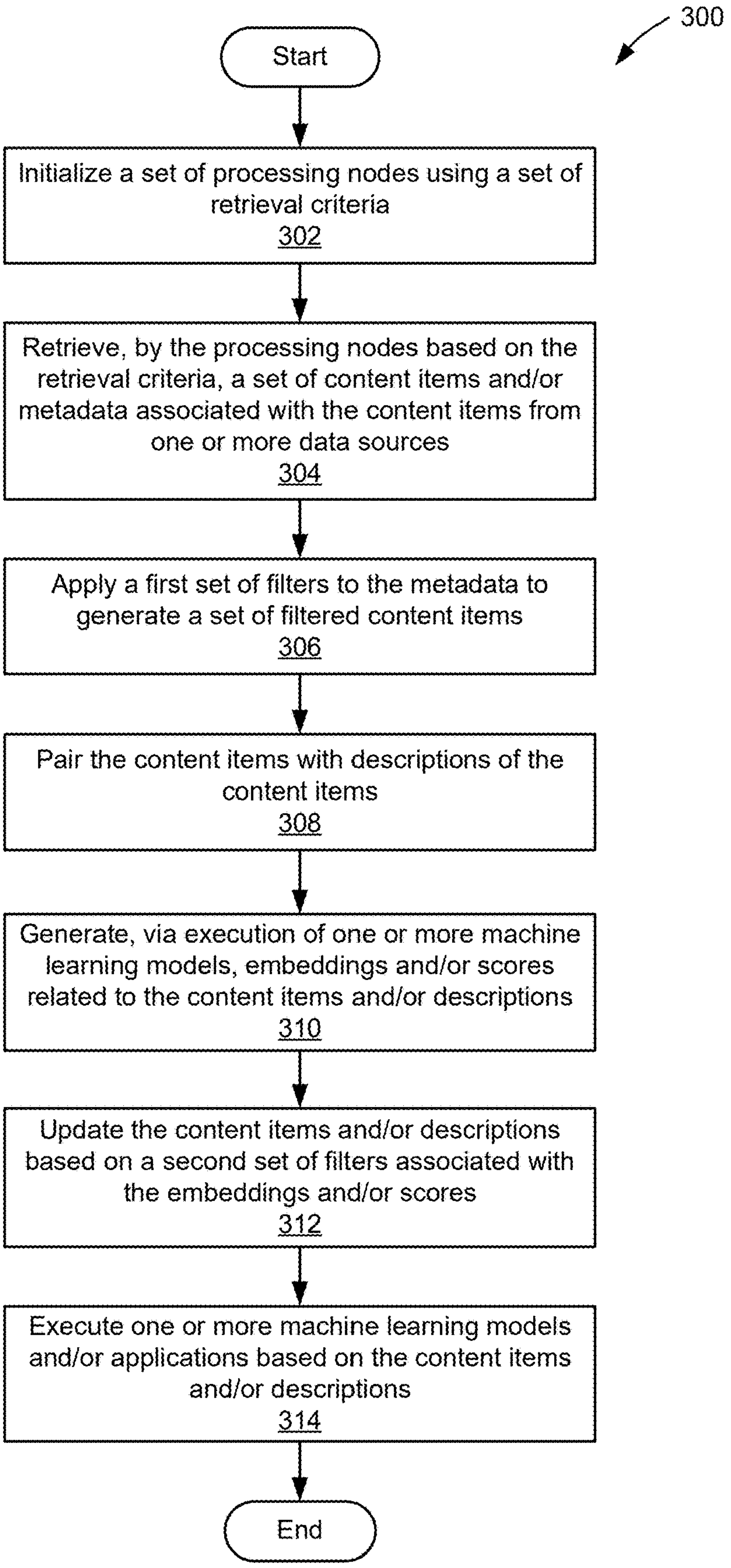
FIG. 3 illustrates a flow diagram of a method for generating performing conditional data sourcing and curation, according to at least one embodiment.

Now referring to FIG. 3, each block of method 300, described herein, comprises a computing process that may be performed using any combination of hardware, firmware, and/or software. For instance, various functions may be carried out by a processor executing instructions stored in memory. The method may also be embodied as computer-usable instructions stored on computer storage media. The method may be provided by a standalone application, a service or hosted service (standalone or in combination with another hosted service), or a plug-in to another product, to name a few. In addition, method 300 is described, by way of example, with respect to the system of FIGS. 1-2. However, this method may additionally or alternatively be executed by any one system, or any combination of systems, including, but not limited to, those described herein.

FIG. 3 illustrates a flow diagram of a method for generating performing conditional data sourcing and curation, according to at least one embodiment. As shown in FIG. 3, method 300 begins with operation 302, in which management engine 126 initializes a set of processing nodes using a set of retrieval criteria. For example, management engine 126 may initialize each processing node using retrieval criteria that include (but are not limited to) one or more data sources from which content and/or metadata is to be retrieved, one or more types of content and/or metadata to be retrieved from the data source(s), data formats and/or file types associated with the content and/or metadata, and/or parameters that can be used to "assign" the retrieval of a subset of content and/or metadata to the processing node. Management engine 126 may also initialize a monitoring component that runs on each processing node.

In operation 304, data sourcing pipeline 122 uses the processing nodes to retrieve a set of content items and/or metadata associated with the content items from the data source(s). Continuing with the above example, each processing node may operate independently (e.g., without synchronization and/or communication with the other processing nodes) to download metadata and/or content based on the corresponding retrieval criteria. While the processing node executes, the corresponding monitoring component may periodically and/or continuously check for error codes that represent crashes and/or other types of failures on the corresponding processing node. The monitoring component may also track the progress of the processing node in retrieving content and/or metadata from the data source(s). When the monitoring component detects a failure in the corresponding processing node, the monitoring component reinitializes the processing node so that the processing node resumes retrieval of remaining content and/or metadata assigned to the processing node instead of restarting the retrieval process from the beginning.

In operation 306, data sourcing pipeline 122 applies a first set of filters to the metadata to generate a set of filtered content items. For example, data sourcing pipeline 122 may apply conditional filters that specify keywords, categories, sentiments, named entities, topics, actions, and/or other criteria for inclusion in the set of filtered content items and/or exclusion from the set of filtered content items. Data sourcing pipeline 122 may also, or instead, apply deduplication filters that are applied to the content items and/or metadata to deduplicate the content items. Data sourcing pipeline 122 may also, or instead, apply usage filters that include content items in the set of filtered content items and/or exclude content items from the set of filtered content items based on licenses, access permissions, robots. txt files, intellectual property rights, and/or other usage-based criteria. Data sourcing pipeline 122 may also, or instead, apply attribute filters that specify file sizes, resolutions, bit rates, and/or other data-oriented attributes of content items to be included in the set of filtered content items and/or excluded from the set of filtered content items.

In operation 308, data sourcing pipeline 122 pairs the content items with descriptions of the content items. For example, data sourcing pipeline 122 may associate each content item with a description that includes the text of an "alt" attribute for that content item, the title of a webpage that links to and/or includes that content item, and/or other metadata associated with that content item. Data sourcing pipeline 122 may also store a mapping of each content item to the corresponding description (e.g., in a database, index, data structure, etc.) and/or add the content item and the description to a dataset.

In operation 310, data curation pipeline 122 generates, via execution of one or more machine learning models, embeddings and/or scores related to the content items and/or descriptions. In operation 312, data curation pipeline 122 updates the content items and/or descriptions based on a second set of filters associated with the embeddings and/or scores.

For example, data curation pipeline 122 may use the machine learning model(s) to generate embeddings of the content items and/or descriptions. Data curation pipeline 122 may generate a score between each content item and the corresponding description by computing a cosine similarity, Euclidean distance, and/or another measure of vector similarity between the embedding of the content item and the embedding of the description. Data curation pipeline 122 may apply a threshold specified in the second set of filters to the score. When the score does not meet the threshold, data curation pipeline 122 may use a multimodal language model and/or another type of machine learning model to generate a new description of the content item. Data curation pipeline 122 may also pair the content item with the new description (e.g., by storing the content item and the new description in a dataset and/or generating a mapping of the content item to the new description).

In another example, data curation pipeline 122 may use the machine learning model(s) to generate scores representing predicted probabilities that the corresponding content items and/or descriptions belong to one or more "unsafe" categories (e.g., inappropriate content, restricted content, copyrighted content, etc.). These scores may be compared to corresponding thresholds specified in the second set of filters to determine if the corresponding content items and/or descriptions exceed a certain probability of being unsafe. When one or more scores associated with a given content item and/or description meet or exceed one or more corresponding thresholds representing unsafe content, data curation pipeline 122 may remove and/or omit the content item and description from the dataset.

In operation 314, management engine 126 executes one or more machine learning models and/or applications based on the content items and/or descriptions. For example, management engine 126 may train a language model, generative model, classifier, regression model, and/or another type of machine learning model using one or more portions of the content items and/or descriptions. After the machine learning model is trained, management engine 126 may execute the machine learning model to generate predictions, new content, and/or other types of output related to the content items and/or descriptions. Management engine 126 may also, or instead, use the content items and/or descriptions with a RAG pipeline that augments a prompt to the machine learning model with matching content and/or descriptions. Management engine 126 may also, or instead, use the content items and/or descriptions to generate recommendations, user interface workflows, teaching materials, and/or experimental results associated with the content items and/or descriptions.

In sum, the disclosed techniques provide a conditional data sourcing and curation pipeline that generates a dataset of content that is targeted to a specific use case or set of use cases. The pipeline includes a distributed architecture that uses multiple independent processing nodes to retrieve content items from various data sources. For example, the pipeline may configure the processing nodes to retrieve content such as (but not limited to) images, video, audio, text, three-dimensional (3D) content, and/or multimodal content from data sources such as (but not limited to) the Internet, a set of websites, one or more archives, one or more filesystems, and/or one or more databases. Each processing node is configured to operate independently on a different subset of content items and can be restarted after experiencing an error or failure without affecting other processing nodes. When a processing node is restarted, the processing node is configured to continue retrieving content items from the corresponding subset of content without re-retrieving previously retrieved content items.

The pipeline also applies a first set of customizable filters to metadata associated with the retrieved content items to tailor the retrieved content to the corresponding use case(s). For example, the filters may include (but are not limited to) keywords, categories, deduplication filters, and/or usage filters (e.g., restrictions on the use of the content items) associated with data sources for the content items and/or the content items. The filters may be used to exclude certain data sources and/or content items from the dataset and/or include certain data sources and/or content items in the dataset.

The pipeline also applies a second set of customizable filters to (i) filtered content items that pass the first set of filters and (ii) text descriptions paired with the filtered content items. For example, the pipeline may pair each filtered content item with a text description that is obtained from an "alt" attribute associated with the filtered content item, a title of a webpage that includes and/or links to the filtered content item, and/or another source of metadata for the filtered content item. The pipeline may also use a set of machine learning models to generate (i) embeddings of the filtered content items and/or text descriptions and (ii) scores representing predictions of appropriateness, relevance, similarity, and/or other attributes associated with the filtered content items and/or text descriptions. The pipeline may compare the scores with corresponding thresholds in the second set of customizable filters and update the filtered content items and/or text descriptions based on the results of the comparisons. These thresholds may be used to remove unsafe and/or inappropriate content, replace text descriptions that are irrelevant to the corresponding content items with more relevant text descriptions, and/or perform other tasks related to the filtered content items and/or text descriptions. The updated filtered content items and/or text descriptions may then be used to train a machine learning model, execute an application, and/or perform another task associated with a corresponding use case.

One technical advantage of the disclosed techniques relative to prior approaches is the ability to retrieve and process large volumes of data in a scalable, efficient, and fault-tolerant manner via a set of distributed processing nodes. Consequently, the disclosed techniques may handle larger volumes of data and/or retrieve data more quickly than conventional approaches that lack the ability to configure, execute, and/or restart processing nodes in an independent manner. Another technical advantage of the disclosed techniques is the ability to generate large-scale datasets that are balanced and that meet various conditions and/or constraints. Accordingly, datasets generated via the disclosed techniques may be higher quality and/or more relevant to the corresponding use cases than datasets generated via conventional techniques. Further, machine learning models, applications, and/or other technologies that use and/or incorporate these datasets may be more accurate, compliant, and/or performant than technologies that use large-scale data generated via conventional approaches.

The systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational AI, light transport simulation (e.g., ray-tracing, path tracing, etc.), collaborative content creation for 3D assets, cloud computing, generative AI, and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implemented at least partially in a data center, systems for performing conversational AI operations, systems implementing one or more language models such as one or more large language models (LLMs), one or more vision language models (VLMs), one or more multi-modal language models, etc., systems for performing light transport simulation, systems for performing collaborative content creation for 3D assets, systems implemented at least partially using cloud computing resources, and/or other types of systems.

Inference and Training Logic

Figure 4A:
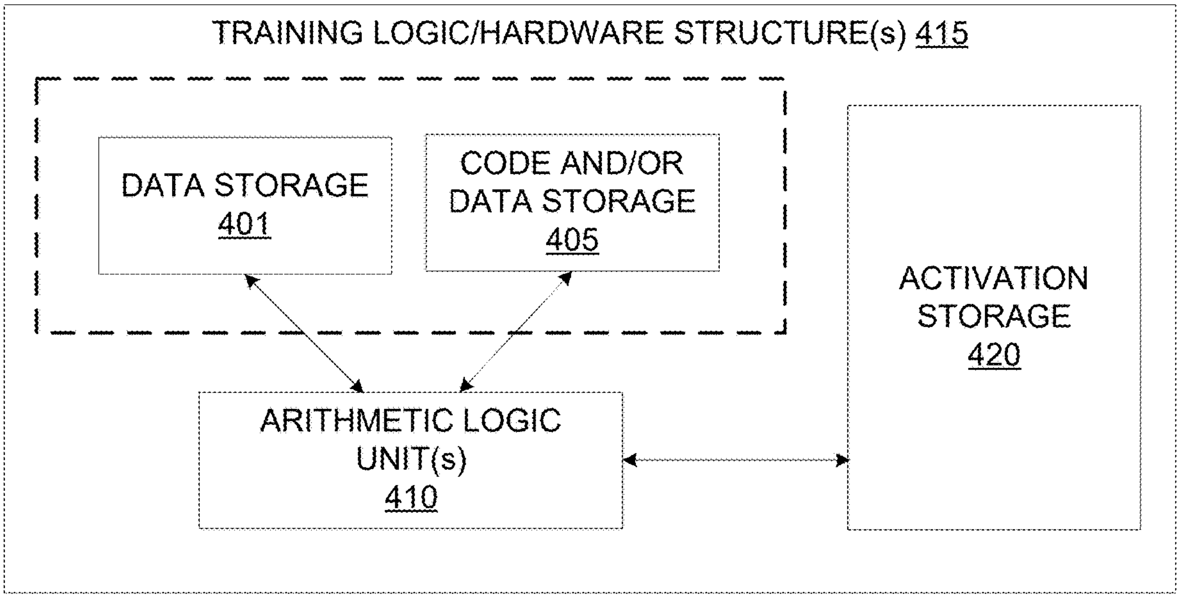
FIG. 4A illustrates inference and/or training logic, according to at least one embodiment.

FIG. 4A illustrates inference and/or training logic 415 used to perform inferencing and/or training operations associated with one or more embodiments. Details regarding inference and/or training logic 415 are provided herein in conjunction with at least FIGS. 4A and/or 4B.

In at least one embodiment, inference and/or training logic 415 may include, without limitation, code and/or data storage 401 to store forward and/or output weight and/or input/output data, and/or other parameters to configure neurons or layers of a neural network trained and/or used for inferencing in aspects of one or more embodiments. In at least one embodiment, training logic 415 may include, or be coupled to code and/or data storage 401 to store graph code or other software to control timing and/or order, in which weight and/or other parameter information is to be loaded to configure, logic, including integer and/or floating point units (collectively, arithmetic logic units (ALUs)). In at least one embodiment, code, such as graph code, loads weight or other parameter information into processor ALUs based on an architecture of a neural network to which such code corresponds. In at least one embodiment, code and/or data storage 401 stores weight parameters and/or input/output data of each layer of a neural network trained or used in conjunction with one or more embodiments during forward propagation of input/output data and/or weight parameters during training and/or inferencing using aspects of one or more embodiments. In at least one embodiment, any portion of code and/or data storage 401 may be included with other on-chip or off-chip data storage, including a processor's L1, L2, or L3 cache or system memory.

In at least one embodiment, any portion of code and/or data storage 401 may be internal or external to one or more processors or other hardware logic devices or circuits. In at least one embodiment, code and/or code and/or data storage 401 may be cache memory, dynamic randomly addressable memory ("DRAM"), static randomly addressable memory ("SRAM"), non-volatile memory (e.g., flash memory), or other storage. In at least one embodiment, a choice of whether code and/or code and/or data storage 401 is internal or external to a processor, for example, or comprising DRAM, SRAM, flash or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 415 may include, without limitation, a code and/or data storage 405 to store backward and/or output weight and/or input/output data corresponding to neurons or layers of a neural network trained and/or used for inferencing in aspects of one or more embodiments. In at least one embodiment, code and/or data storage 405 stores weight parameters and/or input/output data of each layer of a neural network trained or used in conjunction with one or more embodiments during backward propagation of input/output data and/or weight parameters during training and/or inferencing using aspects of one or more embodiments. In at least one embodiment, training logic 415 may include, or be coupled to code and/or data storage 405 to store graph code or other software to control timing and/or order, in which weight and/or other parameter information is to be loaded to configure, logic, including integer and/or floating point units (collectively, arithmetic logic units (ALUs)).

In at least one embodiment, code, such as graph code, causes the loading of weight or other parameter information into processor ALUs based on an architecture of a neural network to which such code corresponds. In at least one embodiment, any portion of code and/or data storage 405 may be included with other on-chip or off-chip data storage, including a processor's L1, L2, or L3 cache or system memory. In at least one embodiment, any portion of code and/or data storage 405 may be internal or external to one or more processors or other hardware logic devices or circuits. In at least one embodiment, code and/or data storage 405 may be cache memory, DRAM, SRAM, non-volatile memory (e.g., flash memory), or other storage. In at least one embodiment, a choice of whether code and/or data storage 405 is internal or external to a processor, for example, or comprising DRAM, SRAM, flash memory or some other storage type may depend on available storage on-chip versus off-chip, latency requirements of training and/or inferencing functions being performed, batch size of data used in inferencing and/or training of a neural network, or some combination of these factors.

In at least one embodiment, code and/or data storage 401 and code and/or data storage 405 may be separate storage structures. In at least one embodiment, code and/or data storage 401 and code and/or data storage 405 may be a combined storage structure. In at least one embodiment, code and/or data storage 401 and code and/or data storage 405 may be partially combined and partially separate. In at least one embodiment, any portion of code and/or data storage 401 and code and/or data storage 405 may be included with other on-chip or off-chip data storage, including a processor's L1, L2, or L3 cache or system memory.

In at least one embodiment, inference and/or training logic 415 may include, without limitation, one or more arithmetic logic unit(s) ("ALU(s)") 410, including integer and/or floating point units, to perform logical and/or mathematical operations based, at least in part on, or indicated by, training and/or inference code (e.g., graph code), a result of which may produce activations (e.g., output values from layers or neurons within a neural network) stored in an activation storage 420 that are functions of input/output and/or weight parameter data stored in code and/or data storage 401 and/or code and/or data storage 405. In at least one embodiment, activations stored in activation storage 420 are generated according to linear algebraic and or matrix-based mathematics performed by ALU(s) 410 in response to performing instructions or other code, wherein weight values stored in code and/or data storage 405 and/or data storage 401 are used as operands along with other values, such as bias values, gradient information, momentum values, or other parameters or hyperparameters, any or all of which may be stored in code and/or data storage 405 or code and/or data storage 401 or another storage on or off-chip.

In at least one embodiment, ALU(s) 410 are included within one or more processors or other hardware logic devices or circuits, whereas in another embodiment, ALU(s) 410 may be external to a processor or other hardware logic device or circuit that uses them (e.g., a co-processor). In at least one embodiment, ALUs 410 may be included within a processor's execution units or otherwise within a bank of ALUs accessible by a processor's execution units either within same processor or distributed between different processors of different types (e.g., central processing units, graphics processing units, fixed function units, etc.). In at least one embodiment, code and/or data storage 401, code and/or data storage 405, and activation storage 420 may share a processor or other hardware logic device or circuit, whereas in another embodiment, they may be in different processors or other hardware logic devices or circuits, or some combination of same and different processors or other hardware logic devices or circuits. In at least one embodiment, any portion of activation storage 420 may be included with other on-chip or off-chip data storage, including a processor's L1, L2, or L3 cache or system memory. Furthermore, inferencing and/or training code may be stored with other code accessible to a processor or other hardware logic or circuit and fetched and/or processed using a processor's fetch, decode, scheduling, execution, retirement and/or other logical circuits.

In at least one embodiment, activation storage 420 may be cache memory, DRAM, SRAM, non-volatile memory (e.g., flash memory), or other storage. In at least one embodiment, activation storage 420 may be completely or partially within or external to one or more processors or other logical circuits. In at least one embodiment, a choice of whether activation storage 420 is internal or external to a processor, for example, or comprising DRAM, SRAM, flash memory or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 415 illustrated in FIG. 4A may be used in conjunction with an application-specific integrated circuit ("ASIC"), such as a TensorFlow® Processing Unit from Google, an inference processing unit (IPU) from Graphcore™, or a Nervana® (e.g., "Lake Crest") processor from Intel Corp. In at least one embodiment, inference and/or training logic 415 illustrated in FIG. 4A may be used in conjunction with central processing unit ("CPU") hardware, graphics processing unit ("GPU") hardware or other hardware, such as field programmable gate arrays ("FPGAs").

Figure 4B:
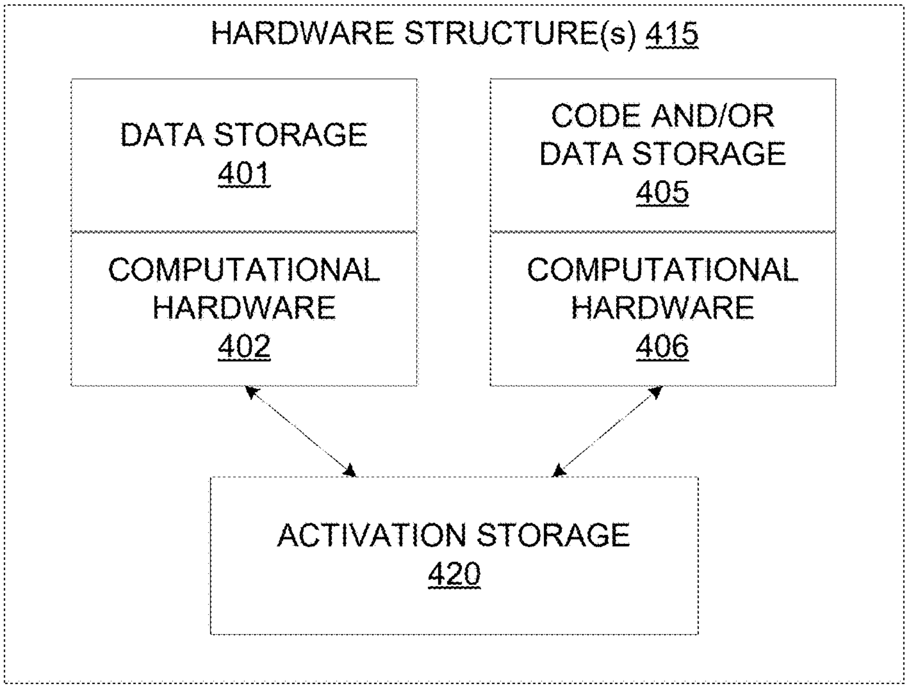
FIG. 4B illustrates inference and/or training logic, according to at least one embodiment.

FIG. 4B illustrates inference and/or training logic 415, according to at least one embodiment. In at least one embodiment, inference and/or training logic 415 may include, without limitation, hardware logic in which computational resources are dedicated or otherwise exclusively used in conjunction with weight values or other information corresponding to one or more layers of neurons within a neural network. In at least one embodiment, inference and/or training logic 415 illustrated in FIG. 4B may be used in conjunction with an application-specific integrated circuit (ASIC), such as TensorFlow® Processing Unit from Google, an inference processing unit (IPU) from Graphcore™, or a Nervana® (e.g., "Lake Crest") processor from Intel Corp. In at least one embodiment, inference and/or training logic 415 illustrated in FIG. 4B may be used in conjunction with central processing unit (CPU) hardware, graphics processing unit (GPU) hardware or other hardware, such as field programmable gate arrays (FPGAs). In at least one embodiment, inference and/or training logic 415 includes, without limitation, code and/or data storage 401 and code and/or data storage 405, which may be used to store code (e.g., graph code), weight values and/or other information, including bias values, gradient information, momentum values, and/or other parameter or hyperparameter information. In at least one embodiment illustrated in FIG. 4B, each of code and/or data storage 401 and code and/or data storage 405 is associated with a dedicated computational resource, such as computational hardware 402 and computational hardware 406, respectively. In at least one embodiment, each of computational hardware 402 and computational hardware 406 comprises one or more ALUs that perform mathematical functions, such as linear algebraic functions, only on information stored in code and/or data storage 401 and code and/or data storage 405, respectively, result of which is stored in activation storage 420.

In at least one embodiment, each of code and/or data storage 401 and 405 and corresponding computational hardware 402 and 406, respectively, correspond to different layers of a neural network, such that resulting activation from one storage/computational pair 401/402 of code and/or data storage 401 and computational hardware 402 is provided as an input to a next storage/computational pair 405/406 of code and/or data storage 405 and computational hardware 406, in order to mirror a conceptual organization of a neural network. In at least one embodiment, each of storage/computational pairs 401/402 and 405/406 may correspond to more than one neural network layer. In at least one embodiment, additional storage/computation pairs (not shown) subsequent to or EXAMPLE LANGUAGE MODELS.

In at least some embodiments, language models, such as large language models (LLMs) and/or other types of generative artificial intelligence (AI) may be implemented. These models may be capable of understanding, summarizing, translating, and/or otherwise generating text (e.g., natural language text, code, etc.), images, video, computer aided design (CAD) assets, omniverse and/or metaverse file information (e.g., in USD format), and/or the like, based on the context provided in input prompts or queries. These language models may be considered "large," in embodiments, based on the models being trained on massive datasets and having architectures with large number of learnable network parameters (weights and biases)—such as millions or billions of parameters. The LLMs/VLMs/etc. may be implemented for summarizing textual data, analyzing and extracting insights from data (e.g., textual, image, video, etc.), and generating new text/image/video/etc. in user-specified styles, tones, or formats. The LLMs of the present disclosure may be used exclusively for text processing, in embodiments, whereas in other embodiments, multimodal LLMs may be implemented to accept, understand, and/or generate text along with other types of content like images, audio, and/or video. For example, vision language models (VLMs), or more generally multimodal language models, may be implemented to accept image, video, audio, textual, 3D design (e.g., CAD), and/or other inputs data types and/or to generate or output image, video, audio, textual, 3D design, and/or other output data types.

Various types of LLM/VLM/etc. architectures may be implemented in various embodiments. For example, different architectures may be implemented that use different techniques for understanding and generating outputs-such as text, audio, video, image, etc. In some embodiments, LLM architectures such as recurrent neural networks (RNNs) or long short-term memory networks (LSTMs) may be used, while in other embodiments transformer architectures—such as those that rely on self-attention mechanisms—may be used to understand and recognize relationships between words or tokens. The language models of the present disclosure may include encoder and/or decoder block(s). For example, discriminative or encoder-only LLMs like BERT (Bidirectional Encoder Representations from Transformers) may be implemented for tasks that involve language comprehension such as classification, sentiment analysis, question answering, and named entity recognition. As another example, generative or decoder-only LLMs like GPT (Generative Pretrained Transformer) may be implemented for tasks that involve language and content generation such as text completion, story generation, and dialogue generation. LLMs that include both encoder and decoder components like T5 (Text-to-Text Transformer) may be implemented to understand and generate content, such as for translation and summarization. These examples are not intended to be limiting, and any architecture type including but not limited to those described herein—may be implemented depending on the particular embodiment and the task(s) being performed using the model(s).

In various embodiments, the LLMs/VLMs/etc. may be trained using unsupervised learning, in which an LLM learns patterns from large amounts of unlabeled text/audio/video/image/etc. data. Due to the extensive training, in embodiments, the models may not require task-specific or domain-specific training. LLMs that have undergone extensive pre-training on vast amounts of unlabeled text data may be referred to as foundation models and may be adept at a variety of tasks like question-answering, summarization, filling in missing information, and translation. Some LLMs may be tailored for a specific use case using techniques like prompt tuning, fine-tuning, retrieval augmented generation (RAG), adding adapters (e.g., customized neural networks, and/or neural network layers, that tune or adjust prompts or tokens to bias the language model toward a particular task or domain), and/or using other fine-tuning or tailoring techniques that optimize the models for use on particular tasks and/or within particular domains.

In some embodiments, the LLMs/VLMs/etc. of the present disclosure may be implemented using various model alignment techniques. For example, in some embodiments, guardrails may be implemented to identify improper or undesired inputs (e.g., prompts) and/or outputs of the models. In some non-limiting embodiments, the guardrails implemented may be similar to those described in U.S. patent application No. 18,304,341, filed on Apr. 20, 2023, the contents of which are hereby incorporated by reference in their entirety. In some embodiments, one or more additional models—or layers thereof—may be implemented to identify issues with inputs and/or outputs of the models. For example, these "safeguard" models may be trained to identify inputs and/or outputs that are "safe" or otherwise okay or desired and/or that are "unsafe" or are otherwise undesired for the particular application/implementation. As a result, the LLMs/VLMs/etc. of the present disclosure may be less likely to output language/text/audio/etc. that may be offensive, vulgar, improper, unsafe, out of domain, and/or otherwise undesired for the particular application/implementation.

In some embodiments, the LLMs/VLMs/etc. may be configured to or capable of accessing or using one or more plug-ins, application programming interfaces (APIs), databases, data stores, repositories, etc. For example, for certain tasks or operations that the model is not ideally suited for, the model may have instructions (e.g., as a result of training, and/or based on instructions in a given prompt) to access one or more plug-ins (e.g., 3rd party plugins) for help in processing the current input. In such an example, where at least part of a prompt is related to restaurants or weather, the model may access one or more restaurant or weather plug-ins (e.g., via one or more APIs) to retrieve the relevant information. As another example, where at least part of a response requires a mathematical computation, the model may access one or more math plug-ins or APIs for help in solving the problem(s), and may then use the response from the plug-in and/or API in the output from the model. This process may be repeated—e.g., recursively—for any number of iterations and using any number of plug-ins and/or APIs until a response to the input prompt can be generated that addresses each ask/question/request/process/operation/etc. As such, the model(s) may not only rely on its own knowledge from training on a large dataset(s), but also on the expertise or optimized nature of one or more external resources-such as APIs, plug-ins, and/or the like.

Neural Network Training and Deployment

Figure 5:
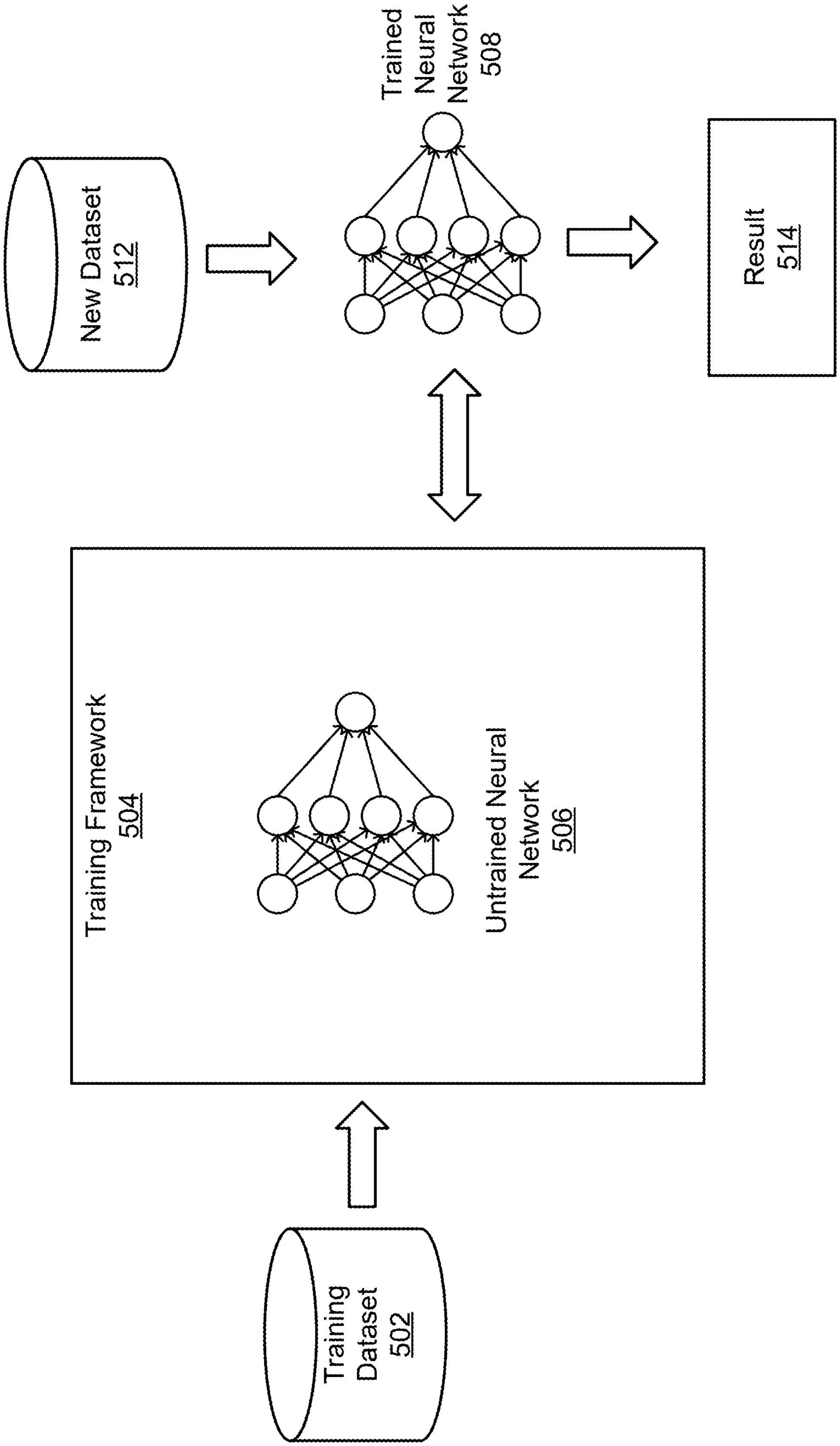
FIG. 5 illustrates training and deployment of a neural network, according to at least one embodiment.

FIG. 5 illustrates training and deployment of a deep neural network, according to at least one embodiment. In at least one embodiment, untrained neural network 506 is trained using a training dataset 502. In at least one embodiment, training framework 504 is a PyTorch framework, whereas in other embodiments, training framework 504 is a TensorFlow, Boost, Caffe, Microsoft Cognitive Toolkit/CNTK, MXNet, Chainer, Keras, Deeplearning4j, or other training framework. In at least one embodiment, training framework 504 trains an untrained neural network 506 and enables it to be trained using processing resources described herein to generate a trained neural network 508. In at least one embodiment, weights may be chosen randomly or by pre-training using a deep belief network. In at least one embodiment, training may be performed in either a supervised, partially supervised, or unsupervised manner.

In at least one embodiment, untrained neural network 506 is trained using supervised learning, wherein training dataset 502 includes an input paired with a desired output for an input, or where training dataset 502 includes input having a known output and an output of neural network 506 is manually graded. In at least one embodiment, untrained neural network 506 is trained in a supervised manner and processes inputs from training dataset 502 and compares resulting outputs against a set of expected or desired outputs. In at least one embodiment, errors are then propagated back through untrained neural network 506. In at least one embodiment, training framework 504 adjusts weights that control untrained neural network 506. In at least one embodiment, training framework 504 includes tools to monitor how well untrained neural network 506 is converging towards a model, such as trained neural network 508, suitable to generating correct answers, such as in result 514, based on input data such as a new dataset 512. In at least one embodiment, training framework 504 trains untrained neural network 506 repeatedly while adjust weights to refine an output of untrained neural network 506 using a loss function and adjustment algorithm, such as stochastic gradient descent. In at least one embodiment, training framework 504 trains untrained neural network 506 until untrained neural network 506 achieves a desired accuracy. In at least one embodiment, trained neural network 508 can then be deployed to implement any number of machine learning operations.

In at least one embodiment, untrained neural network 506 is trained using unsupervised learning, wherein untrained neural network 506 attempts to train itself using unlabeled data. In at least one embodiment, unsupervised learning training dataset 502 will include input data without any associated output data or "ground truth" data. In at least one embodiment, untrained neural network 506 can learn groupings within training dataset 502 and can determine how individual inputs are related to untrained dataset 502. In at least one embodiment, unsupervised training can be used to generate a self-organizing map in trained neural network 508 capable of performing operations useful in reducing dimensionality of new dataset 512. In at least one embodiment, unsupervised training can also be used to perform anomaly detection, which allows identification of data points in new dataset 512 that deviate from normal patterns of new dataset 512.

In at least one embodiment, semi-supervised learning may be used, which is a technique in which in training dataset 502 includes a mix of labeled and unlabeled data. In at least one embodiment, training framework 504 may be used to perform incremental learning, such as through transferred learning techniques. In at least one embodiment, incremental learning enables trained neural network 508 to adapt to new dataset 512 without forgetting knowledge instilled within trained neural network 508 during initial training.

In at least one embodiment, training framework 504 is a framework processed in connection with a software development toolkit such as an OpenVINO (Open Visual Inference and Neural network Optimization) toolkit. In at least one embodiment, an Open VINO toolkit is a toolkit such as those developed by Intel Corporation of Santa Clara, CA.

In at least one embodiment, Open VINO is a toolkit for facilitating development of applications, specifically neural network applications, for various tasks and operations, such as human vision emulation, speech recognition, natural language processing, recommendation systems, and/or variations thereof. In at least one embodiment, Open VINO supports neural networks such as convolutional neural networks (CNNs), recurrent and/or attention-based neural networks, and/or various other neural network models. In at least one embodiment, Open VINO supports various software libraries such as OpenCV, OpenCL, and/or variations thereof.

In at least one embodiment, Open VINO supports neural network models for various tasks and operations, such as classification, segmentation, object detection, face recognition, speech recognition, pose estimation (e.g., humans and/or objects), monocular depth estimation, image inpainting, style transfer, action recognition, colorization, and/or variations thereof.

In at least one embodiment, Open VINO comprises one or more software tools and/or modules for model optimization, also referred to as a model optimizer. In at least one embodiment, a model optimizer is a command line tool that facilitates transitions between training and deployment of neural network models. In at least one embodiment, a model optimizer optimizes neural network models for execution on various devices and/or processing units, such as a GPU, CPU, PPU, GPGPU, and/or variations thereof. In at least one embodiment, a model optimizer generates an internal representation of a model, and optimizes said model to generate an intermediate representation. In at least one embodiment, a model optimizer reduces a number of layers of a model. In at least one embodiment, a model optimizer removes layers of a model that are utilized for training. In at least one embodiment, a model optimizer performs various neural network operations, such as modifying inputs to a model (e.g., resizing inputs to a model), modifying a size of inputs of a model (e.g., modifying a batch size of a model), modifying a model structure (e.g., modifying layers of a model), normalization, standardization, quantization (e.g., converting weights of a model from a first representation, such as floating point, to a second representation, such as integer), and/or variations thereof.

In at least one embodiment, Open VINO comprises one or more software libraries for inferencing, also referred to as an inference engine. In at least one embodiment, an inference engine is a C++ library, or any suitable programming language library. In at least one embodiment, an inference engine is utilized to infer input data. In at least one embodiment, an inference engine implements various classes to infer input data and generate one or more results. In at least one embodiment, an inference engine implements one or more API functions to process an intermediate representation, set input and/or output formats, and/or execute a model on one or more devices.

In at least one embodiment, OpenVINO provides various abilities for heterogeneous execution of one or more neural network models. In at least one embodiment, heterogeneous execution, or heterogeneous computing, refers to one or more computing processes and/or systems that utilize one or more types of processors and/or cores. In at least one embodiment, Open VINO provides various software functions to execute a program on one or more devices. In at least one embodiment, Open VINO provides various software functions to execute a program and/or portions of a program on different devices. In at least one embodiment, Open VINO provides various software functions to, for example, run a first portion of code on a CPU and a second portion of code on a GPU and/or FPGA. In at least one embodiment, Open VINO provides various software functions to execute one or more layers of a neural network on one or more devices (e.g., a first set of layers on a first device, such as a GPU, and a second set of layers on a second device, such as a CPU).

In at least one embodiment, Open VINO includes various functionality similar to functionalities associated with a CUDA programming model, such as various neural network model operations associated with frameworks such as TensorFlow, PyTorch, and/or variations thereof. In at least one embodiment, one or more CUDA programming model operations are performed using OpenVINO. In at least one embodiment, various systems, methods, and/or techniques described herein are implemented using Open VINO.

The systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational AI, light transport simulation (e.g., ray-tracing, path tracing, etc.), collaborative content creation for 3D assets, cloud computing, generative AI, and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implemented at least partially in a data center, systems for performing conversational AI operations, systems implementing one or more language models such as one or more large language models (LLMs), one or more vision language models (VLMs), one or more multi-modal language models, etc., systems for performing light transport simulation, systems for performing collaborative content creation for 3D assets, systems implemented at least partially using cloud computing resources, and/or other types of systems.

Example Language Models

In at least some embodiments, language models, such as large language models (LLMs), vision language models (VLMs), multi-modal language models (MMLMs), and/or other types of generative artificial intelligence (AI) may be implemented. These models may be capable of understanding, summarizing, translating, and/or otherwise generating text (e.g., natural language text, code, etc.), images, video, computer aided design (CAD) assets, OMNIVERSE and/or METAVERSE file information (e.g., in USD format, such as OpenUSD), and/or the like, based on the context provided in input prompts or queries. These language models may be considered "large," in embodiments, based on the models being trained on massive datasets and having architectures with large number of learnable network parameters (weights and biases)—such as millions or billions of parameters. The LLMs/VLMs/MMLMs/etc. may be implemented for summarizing textual data, analyzing and extracting insights from data (e.g., textual, image, video, etc.), and generating new text/image/video/etc. in user-specified styles, tones, and/or formats. The LLMs/VLMs/MMLMs/etc. of the present disclosure may be used exclusively for text processing, in embodiments, whereas in other embodiments, multi-modal LLMs may be implemented to accept, understand, and/or generate text and/or other types of content like images, audio, 2D and/or 3D data (e.g., in USD formats), and/or video. For example, vision language models (VLMs), or more generally multi-modal language models (MMLMs), may be implemented to accept image, video, audio, textual, 3D design (e.g., CAD), and/or other inputs data types and/or to generate or output image, video, audio, textual, 3D design, and/or other output data types.

Various types of LLMs/VLMs/MMLMs/etc. architectures may be implemented in various embodiments. For example, different architectures may be implemented that use different techniques for understanding and generating outputs—such as text, audio, video, image, 2D and/or 3D design or asset data, etc. In some embodiments, LLMs/VLMs/MMLMs/etc. architectures such as recurrent neural networks (RNNs) or long short-term memory networks (LSTMs) may be used, while in other embodiments transformer architectures—such as those that rely on self-attention and/or cross-attention (e.g., between contextual data and textual data) mechanisms—may be used to understand and recognize relationships between words or tokens and/or contextual data (e.g., other text, video, image, design data, USD, etc.). One or more generative processing pipelines that include LLMs/VLMs/MMLMs/etc. may also include one or more diffusion block(s) (e.g., denoisers). The LLMs/VLMs/MMLMs/etc. of the present disclosure may include encoder and/or decoder block(s). For example, discriminative or encoder-only models like BERT (Bidirectional Encoder Representations from Transformers) may be implemented for tasks that involve language comprehension such as classification, sentiment analysis, question answering, and named entity recognition. As another example, generative or decoder-only models like GPT (Generative Pretrained Transformer) may be implemented for tasks that involve language and content generation such as text completion, story generation, and dialogue generation. LLMs/VLMs/MMLMs/etc. that include both encoder and decoder components like T5 (Text-to-Text Transformer) may be implemented to understand and generate content, such as for translation and summarization. These examples are not intended to be limiting, and any architecture type—including but not limited to those described herein—may be implemented depending on the particular embodiment and the task(s) being performed using the LLMs/VLMs/MMLMs/etc.

In various embodiments, the LLMs/VLMs/MMLMs/etc. may be trained using unsupervised learning, in which an LLMs/VLMs/MMLMs/etc. learns patterns from large amounts of unlabeled text/audio/video/image/design/USD/etc. data. Due to the extensive training, in embodiments, the models may not require task-specific or domain-specific training. LLMs/VLMs/MMLMs/etc. that have undergone extensive pre-training on vast amounts of unlabeled data may be referred to as foundation models and may be adept at a variety of tasks like question-answering, summarization, filling in missing information, translation, image/video/design/USD/data generation. Some LLMs/VLMs/MMLMs/etc. may be tailored for a specific use case using techniques like prompt tuning, fine-tuning, retrieval augmented generation (RAG), adding adapters (e.g., customized neural networks, and/or neural network layers, that tune or adjust prompts or tokens to bias the language model toward a particular task or domain), and/or using other fine-tuning or tailoring techniques that optimize the models for use on particular tasks and/or within particular domains.

In some embodiments, the LLMS/VLMS/MMLMS/etc. of the present disclosure may be implemented using various model alignment techniques. For example, in some embodiments, guardrails may be implemented to identify improper or undesired inputs (e.g., prompts) and/or outputs of the models. In doing so, the system may use the guardrails and/or other model alignment techniques to either prevent a particular undesired input from being processed using the LLMs/VLMs/MMLMs/etc., and/or preventing the output or presentation (e.g., display, audio output, etc.) of information generating using the LLMs/VLMs/MMLMs/etc. In some embodiments, one or more additional models—or layers thereof—may be implemented to identify issues with inputs and/or outputs of the models. For example, these "safeguard" models may be trained to identify inputs and/or outputs that are "safe" or otherwise okay or desired and/or that are "unsafe" or are otherwise undesired for the particular application/implementation. As a result, the LLMs/VLMs/MMLMs/etc. of the present disclosure may be less likely to output language/text/audio/video/design data/USD data/etc. that may be offensive, vulgar, improper, unsafe, out of domain, and/or otherwise undesired for the particular application/implementation.

In some embodiments, the LLMs/VLMs/etc. may be configured to or capable of accessing or using one or more plug-ins, application programming interfaces (APIs), databases, data stores, repositories, etc. For example, for certain tasks or operations that the model is not ideally suited for, the model may have instructions (e.g., as a result of training, and/or based on instructions in a given prompt) to access one or more plug-ins (e.g., 3rd party plugins) for help in processing the current input. In such an example, where at least part of a prompt is related to restaurants or weather, the model may access one or more restaurant or weather plug-ins (e.g., via one or more APIs) to retrieve the relevant information. As another example, where at least part of a response requires a mathematical computation, the model may access one or more math plug-ins or APIs for help in solving the problem(s), and may then use the response from the plug-in and/or API in the output from the model. This process may be repeated—e.g., recursively—for any number of iterations and using any number of plug-ins and/or APIs until a response to the input prompt can be generated that addresses each ask/question/request/process/operation/etc. As such, the model(s) may not only rely on its own knowledge from training on a large dataset(s), but also on the expertise or optimized nature of one or more external resources—such as APIs, plug-ins, and/or the like.

In some embodiments, multiple language models (e.g., LLMs/VLMs/MMLMs/etc., multiple instances of the same language model, and/or multiple prompts provided to the same language model or instance of the same language model may be implemented, executed, or accessed (e.g., using one or more plug-ins, user interfaces, APIs, databases, data stores, repositories, etc.) to provide output responsive to the same query, or responsive to separate portions of a query. In at least one embodiment, multiple language models e.g., language models with different architectures, language models trained on different (e.g. updated) corpuses of data may be provided with the same input query and prompt (e.g., set of constraints, conditioners, etc.). In one or more embodiments, the language models may be different versions of the same foundation model. In one or more embodiments, at least one language model may be instantiated as multiple agents—e.g., more than one prompt may be provided to constrain, direct, or otherwise influence a style, a content, or a character, etc., of the output provided. In one or more example, non-limiting embodiments, the same language model may be asked to provide output corresponding to a different role, perspective, character, or having a different base of knowledge, etc.—as defined by a supplied prompt.

In any one of such embodiments, the output of two or more (e.g., each) language models, two or more versions of at least one language model, two or more instanced agents of at least one language model, and/or two more prompts provided to at least one language model may be further processed, e.g., aggregated, compared or filtered against, or used to determine (and provide) a consensus response. In one or more embodiments, the output from one language model—or version, instance, or agent—maybe be provided as input to another language model for further processing and/or validation. In one or more embodiments, a language model may be asked to generate or otherwise obtain an output with respect to an input source material, with the output being associated with the input source material. Such an association may include, for example, the generation of a caption or portion of text that is embedded (e.g., as metadata) with an input source text or image. In one or more embodiments, an output of a language model may be used to determine the validity of an input source material for further processing, or inclusion in a dataset. For example, a language model may be used to assess the presence (or absence) of a target word in a portion of text or an object in an image, with the text or image being annotated to note such presence (or lack thereof). Alternatively, the determination from the language model may be used to determine whether the source material should be included in a curated dataset, for example and without limitation.

Figure 6A:
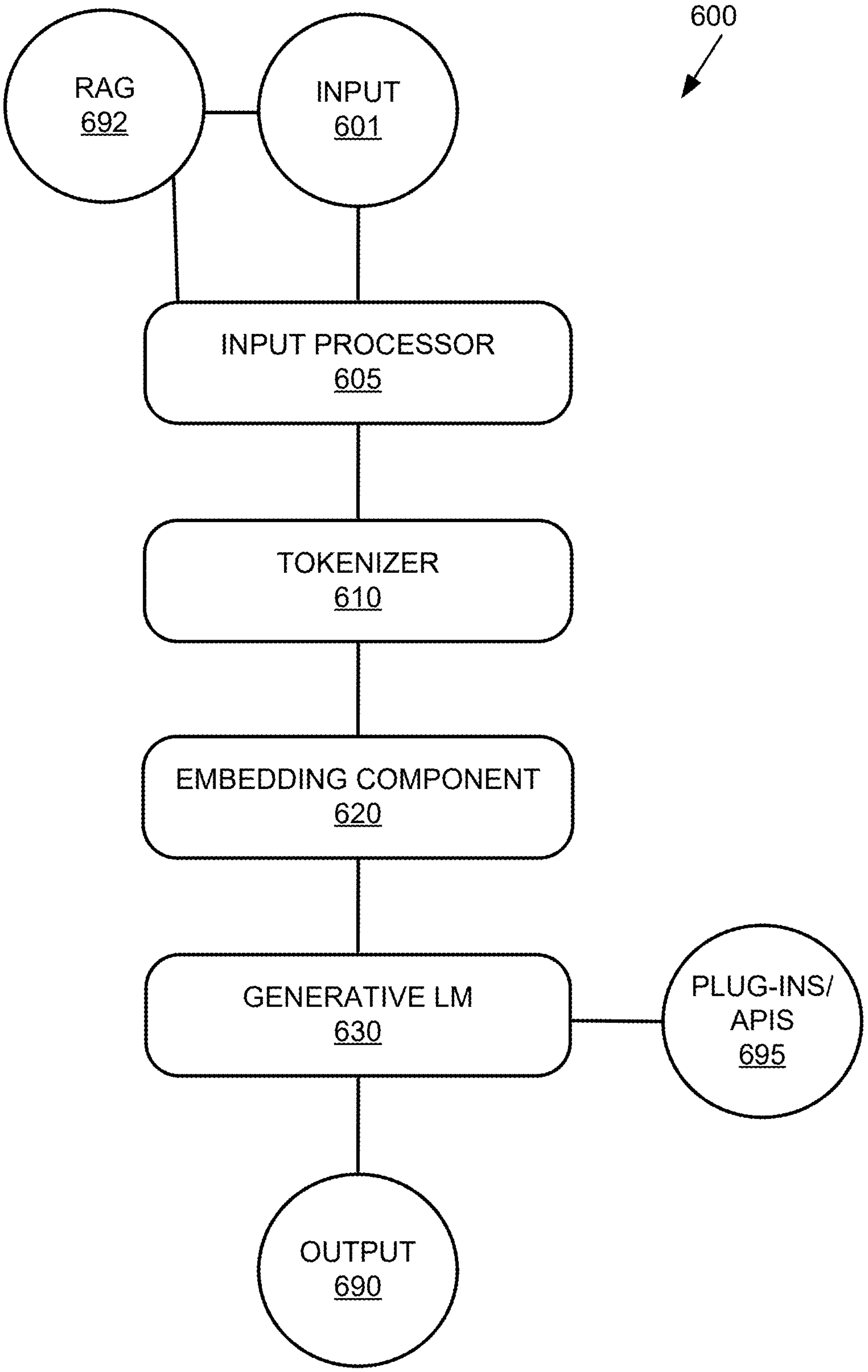
FIG. 6A is a block diagram of an example generative language model system suitable for use in implementing some embodiments of the present disclosure.

FIG. 6A is a block diagram of an example generative language model system 600 suitable for use in implementing at least some embodiments of the present disclosure. In the example illustrated in FIG. 6A, the generative language model system 600 includes a retrieval augmented generation (RAG) component 692, an input processor 605, a tokenizer 610, an embedding component 620, plug-ins/APIs 695, and a generative language model (LM) 630 (which may include an LLM, a VLM, a multi-modal LM, etc.).

At a high level, the input processor 605 may receive an input 601 comprising text and/or other types of input data (e.g., audio data, video data, image data, sensor data (e.g., LiDAR, RADAR, ultrasonic, etc.), 3D design data, CAD data, universal scene descriptor (USD) data, etc.), depending on the architecture of the generative LM 630. In some embodiments, the input 601 includes plain text in the form of one or more sentences, paragraphs, and/or documents. Additionally or alternatively, the input 601 may include numerical sequences, precomputed embeddings (e.g., word or sentence embeddings), and/or structured data (e.g., in tabular formats, JSON, or XML). In some implementations in which the generative LM 630 is capable of processing multimodal inputs, the input 601 may combine text with image data, audio data, and/or other types of input data, such as but not limited to those described herein. Taking raw input text as an example, the input processor 605 may prepare raw input text in various ways. For example, the input processor 605 may perform various types of text cleaning to remove noise (e.g., special characters, punctuation, HTML tags, stopwords) from relevant textual content. In an example involving stopwords (common words that tend to carry little semantic meaning), the input processor 605 may remove stopwords to reduce noise and focus the generative LM 630 on more meaningful content. The input processor 605 may apply text normalization, for example, by converting all characters to lowercase, removing accents, and/or or handling special cases like contractions or abbreviations to ensure consistency. These are just a few examples, and other types of input processing may be applied.

In some embodiments, a RAG component 692 may be used to retrieve additional information to be used as part of the input 601 or prompt. For example, in some embodiments, the input 601 may be generated using the query or input to the model (e.g., a question, a request, etc.) in addition to data retrieved using the RAG component 692. In some embodiments, the input processor 605 may analyze the input 601 and communicate with the RAG component 692 (or the RAG component 692 may be part of the input processor 605, in embodiments) in order to identify relevant text and/or other data to provide to the generative LM 630 as additional context or sources of information from which to identify the response, answer, or output 690, generally. For example, where the input indicates that the user is interested in a desired tire pressure for a particular make and model of vehicle, the RAG component 692 may retrieve—using a vector search in an embedding space, for example—the tire pressure information or the text corresponding thereto from a digital (embedded) version of the user manual for that particular vehicle make and model. Similarly, where a user revisits a chatbot related to a particular product offering or service, the RAG component 692 may retrieve a prior stored conversation history—or at least a summary thereof—and include the prior conversation history along with the current ask/request as part of the input 601 to the generative LM 630.

The tokenizer 610 may segment the (e.g., processed) text into smaller units (tokens) for subsequent analysis and processing. The tokens may represent individual words, subwords, characters, etc., depending on the implementation. Word-based tokenization divides the text into individual words, treating each word as a separate token. Subword tokenization breaks down words into smaller meaningful units (e.g., prefixes, suffixes, stems), enabling the generative LM 630 to understand morphological variations and handle out-of-vocabulary words more effectively. Character-based tokenization represents each character as a separate token, enabling the generative LM 630 to process text at a fine-grained level. The choice of tokenization strategy may depend on factors such as the language being processed, the task at hand, and/or characteristics of the training dataset. As such, the tokenizer 610 may convert the (e.g., processed) text into a structured format according to tokenization schema being implemented in the particular embodiment.

The embedding component 620 may use any known embedding technique to transform discrete tokens into (e.g., dense, continuous vector) representations of semantic meaning. For example, the embedding component 620 may use pre-trained word embeddings (e.g., Word2Vec, GloVe, or FastText), one-hot encoding, Term Frequency-Inverse Document Frequency (TF-IDF) encoding, one or more embedding layers of a neural network, and/or otherwise.

In some implementations in which the input 601 includes image data, the input processor 601 may resize the image data to a standard size compatible with format of a corresponding input channel and/or may normalize pixel values to a common range (e.g., 0 to 1) to ensure a consistent representation, and the embedding component 620 may encode the image data using any known technique (e.g., using one or more convolutional neural networks (CNNs) to extract visual features). In some implementations in which the input 601 includes audio data, the input processor 601 may resample an audio file to a consistent sampling rate for uniform processing, and the embedding component 620 may use any known technique to extract and encode audio features—such as in the form of a spectrogram (e.g., a mel-spectrogram). In some implementations in which the input 601 includes video data, the input processor 601 may extract frames or apply resizing to extracted frames, and the embedding component 620 may extract features such as optical flow embeddings or video embeddings and/or may encode temporal information or sequences of frames. In some implementations in which the input 601 includes multimodal data, the embedding component 620 may fuse representations of the different types of data (e.g., text, image, audio) using techniques like early fusion (concatenation), late fusion (sequential processing), attention-based fusion, etc.

The generative LM 630 and/or other components of the generative LLM system 600 may use different types of neural network architectures depending on the implementation. For example, transformer-based architectures such as those used in models like GPT may be implemented, and may include self-attention mechanisms that weigh the importance of different words or tokens in the input sequence and/or feedforward networks that process the output of the self-attention layers, applying non-linear transformations to the input representations and extracting higher-level features. Some non-limiting example architectures include transformers (e.g., encoder-decoder, decoder only, multimodal), RNNs, LSTMs, fusion models, cross-modal embedding models that learn joint embedding spaces, graph neural networks (GNNs), hybrid architectures combining different types of architectures adversarial networks like generative adversarial networks or GANs or adversarial autoencoders (AAEs) for joint distribution learning, and others. As such, depending on the implementation and architecture, the embedding component 620 may apply an encoded representation of the input 601 to the generative LM 630, and the generative LM 630 may process the encoded representation of the input 601 to generate an output 690, which may include responsive text and/or other types of data.

As described herein, in some embodiments, the generative LM 630 may be configured to access or use—or capable of accessing or using—plug-ins/APIs 695 (which may include one or more plug-ins, application programming interfaces (APIs), databases, data stores, repositories, etc.). For example, for certain tasks or operations that the generative LM 630 is not ideally suited for, the model may have instructions (e.g., as a result of training, and/or based on instructions in a given prompt, such as those retrieved using the RAG component 692) to access one or more plug-ins/APIs 695 (e.g., 3rd party plugins) for help in processing the current input. In such an example, where at least part of a prompt is related to restaurants or weather, the model may access one or more restaurant or weather plug-ins (e.g., via one or more APIs), send at least a portion of the prompt related to the particular plug-in/API 695 to the plug-in/API 695, the plug-in/API 695 may process the information and return an answer to the generative LM 630, and the generative LM 630 may use the response to generate the output 690. This process may be repeated—e.g., recursively—for any number of iterations and using any number of plug-ins/APIs 695 until an output 690 that addresses each ask/question/request/process/operation/etc. from the input 601 can be generated. As such, the model(s) may not only rely on its own knowledge from training on a large dataset(s) and/or from data retrieved using the RAG component 692, but also on the expertise or optimized nature of one or more external resources-such as the plug-ins/APIs 695.

Figure 6B:
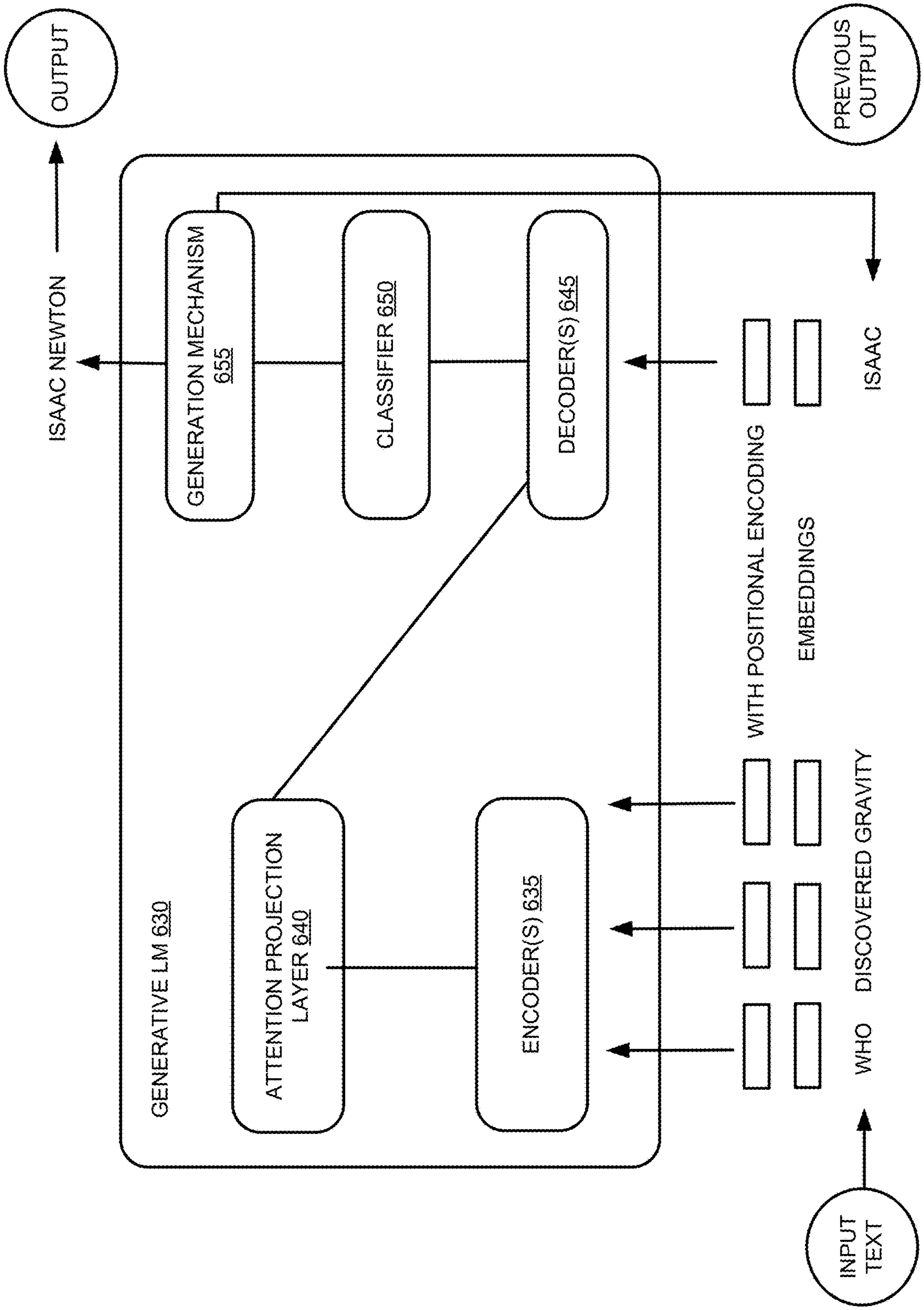
FIG. 6B is a block diagram of an example generative language model that includes a transformer encoder-decoder suitable for use in implementing some embodiments of the present disclosure.

FIG. 6B is a block diagram of an example implementation in which the generative LM 630 includes a transformer encoder-decoder. For example, assume input text such as "Who discovered gravity" is tokenized (e.g., by the tokenizer 610 of FIG. 6A) into tokens such as words, and each token is encoded (e.g., by the embedding component 620 of FIG. 6A) into a corresponding embedding (e.g., of size 512). Since these token embeddings typically do not represent the position of the token in the input sequence, any known technique may be used to add a positional encoding to each token embedding to encode the sequential relationships and context of the tokens in the input sequence. As such, the (e.g., resulting) embeddings may be applied to one or more encoder(s) 635 of the generative LM 630.

In an example implementation, the encoder(s) 635 forms an encoder stack, where each encoder includes a self-attention layer and a feedforward network. In an example transformer architecture, each token (e.g., word) flows through a separate path. As such, each encoder may accept a sequence of vectors, passing each vector through the self-attention layer, then the feedforward network, and then upwards to the next encoder in the stack. Any known self-attention technique may be used. For example, to calculate a self-attention score for each token (word), a query vector, a key vector, and a value vector may be created for each token, a self-attention score may be calculated for pairs of tokens by taking the dot product of the query vector with the corresponding key vectors, normalizing the resulting scores, multiplying by corresponding value vectors, and summing weighted value vectors. The encoder may apply multi-headed attention in which the attention mechanism is applied multiple times in parallel with different learned weight matrices. Any number of encoders may be cascaded to generate a context vector encoding the input. An attention projection layer 640 may convert the context vector into attention vectors (keys and values) for the decoder(s) 645.

In an example implementation, the decoder(s) 645 form a decoder stack, where each decoder includes a self-attention layer, an encoder-decoder self-attention layer that uses the attention vectors (keys and values) from the encoder to focus on relevant parts of the input sequence, and a feedforward network. As with the encoder(s) 635, in an example transformer architecture, each token (e.g., word) flows through a separate path in the decoder(s) 645. During a first pass, the decoder(s) 645, a classifier 650, and a generation mechanism 655 may generate a first token, and the generation mechanism 655 may apply the generated token as an input during a second pass. The process may repeat in a loop, successively generating and adding tokens (e.g., words) to the output from the preceding pass and applying the token embeddings of the composite sequence with positional encodings as an input to the decoder(s) 645 during a subsequent pass, sequentially generating one token at a time (known as auto-regression) until predicting a symbol or token that represents the end of the response. Within each decoder, the self-attention layer is typically constrained to attend only to preceding positions in the output sequence by applying a masking technique (e.g., setting future positions to negative infinity) before the softmax operation. In an example implementation, the encoder-decoder attention layer operates similarly to the (e.g., multi-headed) self-attention in the encoder(s) 635, except that it creates its queries from the layer below it and takes the keys and values (e.g., matrix) from the output of the encoder(s) 635.

As such, the decoder(s) 645 may output some decoded (e.g., vector) representation of the input being applied during a particular pass. The classifier 650 may include a multi-class classifier comprising one or more neural network layers that project the decoded (e.g., vector) representation into a corresponding dimensionality (e.g., one dimension for each supported word or token in the output vocabulary) and a softmax operation that converts logits to probabilities. As such, the generation mechanism 655 may select or sample a word or token based on a corresponding predicted probability (e.g., select the word with the highest predicted probability) and append it to the output from a previous pass, generating each word or token sequentially. The generation mechanism 655 may repeat the process, triggering successive decoder inputs and corresponding predictions until selecting or sampling a symbol or token that represents the end of the response, at which point, the generation mechanism 655 may output the generated response.

Figure 6C:
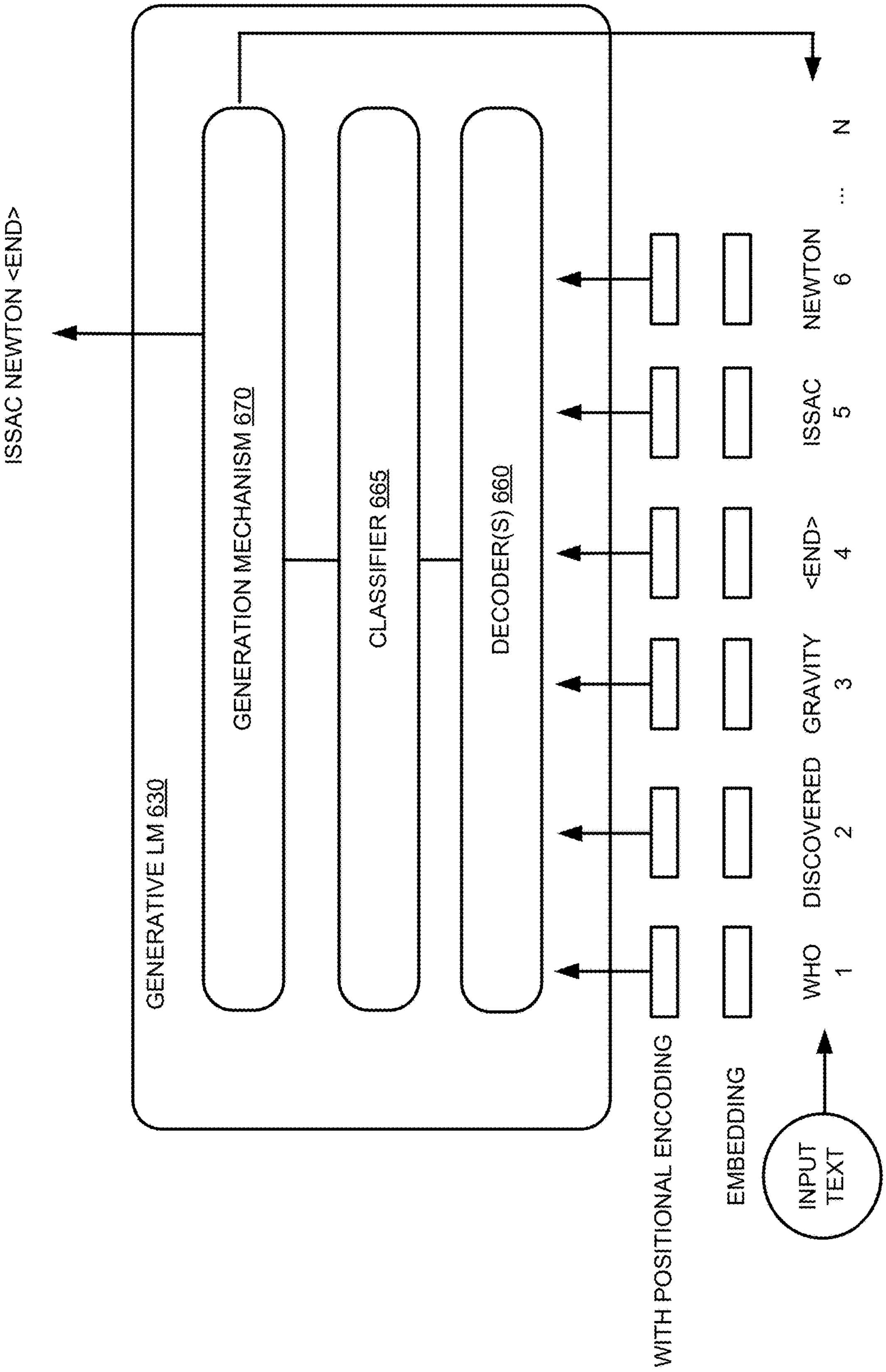
FIG. 6C is a block diagram of an example generative language model that includes a decoder-only transformer architecture suitable for use in implementing some embodiments of the present disclosure.

FIG. 6C is a block diagram of an example implementation in which the generative LM 630 includes a decoder-only transformer architecture. For example, the decoder(s) 660 of FIG. 6C may operate similarly as the decoder(s) 645 of FIG. 6B except each of the decoder(s) 660 of FIG. 6C omits the encoder-decoder self-attention layer (since there is no encoder in this implementation). As such, the decoder(s) 660 may form a decoder stack, where each decoder includes a self-attention layer and a feedforward network. Furthermore, instead of encoding the input sequence, a symbol or token representing the end of the input sequence (or the beginning of the output sequence) may be appended to the input sequence, and the resulting sequence (e.g., corresponding embeddings with positional encodings) may be applied to the decoder(s) 660. As with the decoder(s) 645 of FIG.

6B, each token (e.g., word) may flow through a separate path in the decoder(s) 660, and the decoder(s) 660, a classifier 665, and a generation mechanism 670 may use auto-regression to sequentially generate one token at a time until predicting a symbol or token that represents the end of the response. The classifier 665 and the generation mechanism 670 may operate similarly as the classifier 650 and the generation mechanism 655 of FIG. 6B, with the generation mechanism 670 selecting or sampling each successive output token based on a corresponding predicted probability and appending it to the output from a previous pass, generating each token sequentially until selecting or sampling a symbol or token that represents the end of the response. These and other architectures described herein are meant simply as examples, and other suitable architectures may be implemented within the scope of the present disclosure.

Example Computing Device

Figure 7:
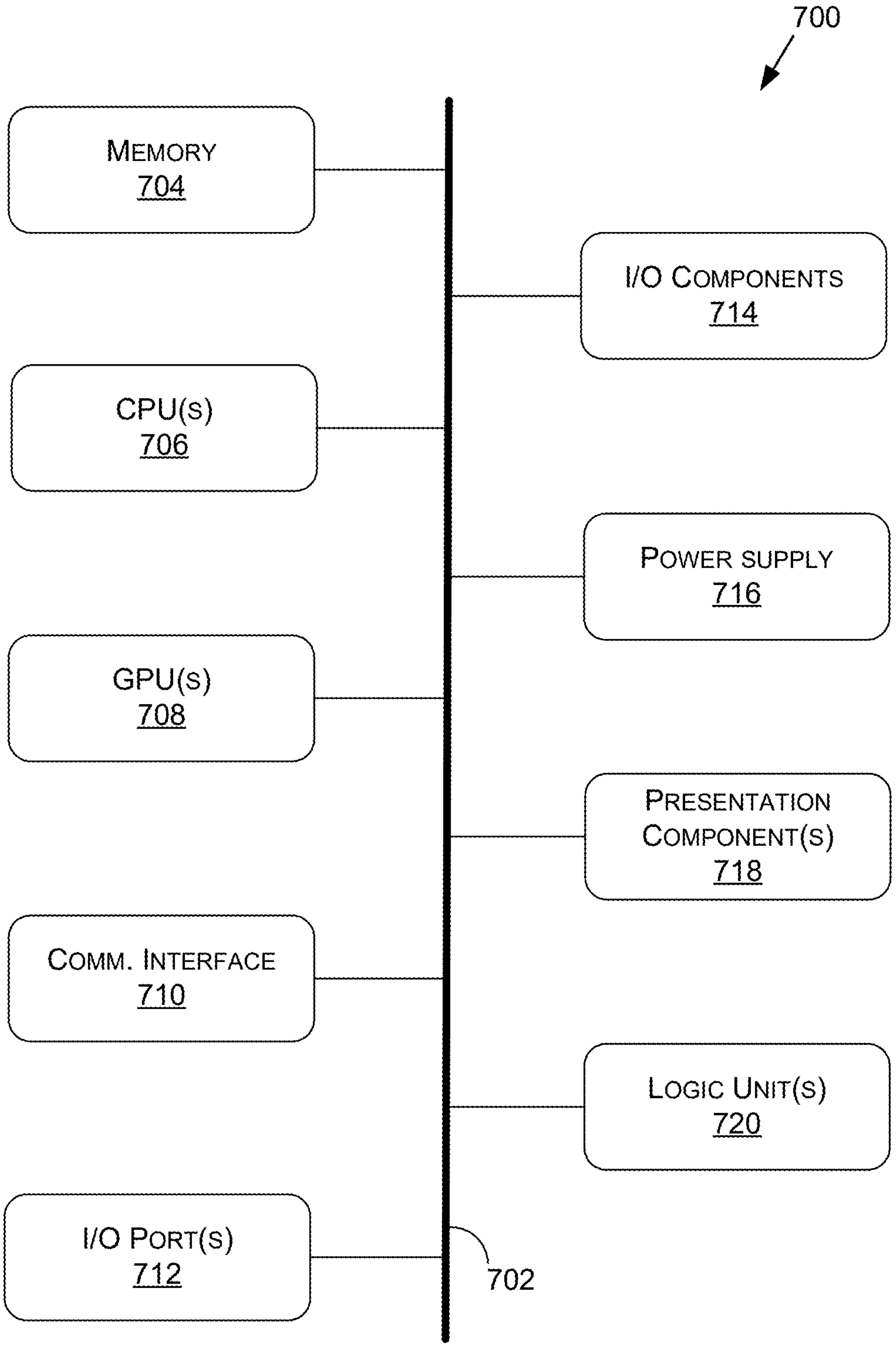
FIG. 7 is a block diagram of an example computing device suitable for use in implementing some embodiments of the present disclosure.

FIG. 7 is a block diagram of an example computing device(s) 700 suitable for use in implementing some embodiments of the present disclosure. Computing device 700 may include an interconnect system 702 that directly or indirectly couples the following devices: memory 704, one or more central processing units (CPUs) 706, one or more graphics processing units (GPUs) 708, a communication interface 710, input/output (I/O) ports 712, input/output components 714, a power supply 716, one or more presentation components 718 (e.g., display(s)), and one or more logic units 720. In at least one embodiment, the computing device(s) 700 may comprise one or more virtual machines (VMs), and/or any of the components thereof may comprise virtual components (e.g., virtual hardware components). For non-limiting examples, one or more of the GPUs 708 may comprise one or more vGPUs, one or more of the CPUs 706 may comprise one or more vCPUs, and/or one or more of the logic units 720 may comprise one or more virtual logic units. As such, a computing device(s) 700 may include discrete components (e.g., a full GPU dedicated to the computing device 700), virtual components (e.g., a portion of a GPU dedicated to the computing device 700), or a combination thereof.

Although the various blocks of FIG. 7 are shown as connected via the interconnect system 702 with lines, this is not intended to be limiting and is for clarity only. For example, in some embodiments, a presentation component 718, such as a display device, may be considered an I/O component 714 (e.g., if the display is a touch screen). As another example, the CPUs 706 and/or GPUs 708 may include memory (e.g., the memory 704 may be representative of a storage device in addition to the memory of the GPUs 708, the CPUs 706, and/or other components). As such, the computing device of FIG. 7 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 7.

The interconnect system 702 may represent one or more links or busses, such as an address bus, a data bus, a control bus, or a combination thereof. The interconnect system 702 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 706 may be directly connected to the memory 704. Further, the CPU 706 may be directly connected to the GPU 708. Where there is direct, or point-to-point connection between components, the interconnect system 702 may include a PCIe link to carry out the connection. In these examples, a PCI bus need not be included in the computing device 700.

The memory 704 may include any of a variety of computer-readable media. The computer-readable media may be any available media that may be accessed by the computing device 700. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 704 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 700. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 706 may be configured to execute at least some of the computer-readable instructions to control one or more components of the computing device 700 to perform one or more of the methods and/or processes described herein. For example, the CPU(s) may be configured to execute one or more processing nodes 218 and/or instances of data sourcing pipeline 122, data curation pipeline 124, and/or management engine 126. The CPU(s) 706 may each include one or more cores (e.g., one, two, four, eight, twenty-eight, seventy-two, etc.) that are capable of handling a multitude of software threads simultaneously. The CPU(s) 706 may include any type of processor, and may include different types of processors depending on the type of computing device 700 implemented (e.g., processors with fewer cores for mobile devices and processors with more cores for servers). For example, depending on the type of computing device 700, the processor may be an Advanced RISC Machines (ARM) processor implemented using Reduced Instruction Set Computing (RISC) or an x86 processor implemented using Complex Instruction Set Computing (CISC). The computing device 700 may include one or more CPUs 706 in addition to one or more microprocessors or supplementary co-processors, such as math co-processors.

In addition to or alternatively from the CPU(s) 706, the GPU(s) 708 may be configured to execute at least some of the computer-readable instructions to control one or more components of the computing device 700 to perform one or more of the methods and/or processes described herein. One or more of the GPU(s) 708 may be an integrated GPU (e.g., with one or more of the CPU(s) 706 and/or one or more of the GPU(s) 708 may be a discrete GPU. In embodiments, one or more of the GPU(s) 708 may be a coprocessor of one or more of the CPU(s) 706. The GPU(s) 708 may be used by the computing device 700 to render graphics (e.g., 3D graphics) or perform general purpose computations. For example, the GPU(s) 708 may be used for General-Purpose computing on GPUs (GPGPU). The GPU(s) 708 may include hundreds or thousands of cores that are capable of handling hundreds or thousands of software threads simultaneously. The GPU(s) 708 may generate pixel data for output images in response to rendering commands (e.g., rendering commands from the CPU(s) 706 received via a host interface). The GPU(s) 708 may include graphics memory, such as display memory, for storing pixel data or any other suitable data, such as GPGPU data. The display memory may be included as part of the memory 704. The GPU(s) 708 may include two or more GPUs operating in parallel (e.g., via a link). The link may directly connect the GPUs (e.g., using NVLINK) or may connect the GPUs through a switch (e.g., using NVSwitch). When combined together, each GPU 708 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 706 and/or the GPU(s) 708, the logic unit(s) 720 may be configured to execute at least some of the computer-readable instructions to control one or more components of the computing device 700 to perform one or more of the methods and/or processes described herein. In embodiments, the CPU(s) 706, the GPU(s) 708, and/or the logic unit(s) 720 may discretely or jointly perform any combination of the methods, processes and/or portions thereof. One or more of the logic units 720 may be part of and/or integrated in one or more of the CPU(s) 706 and/or the GPU(s) 708 and/or one or more of the logic units 720 may be discrete components or otherwise external to the CPU(s) 706 and/or the GPU(s) 708. In embodiments, one or more of the logic units 720 may be a coprocessor of one or more of the CPU(s) 706 and/or one or more of the GPU(s) 708.

Examples of the logic unit(s) 720 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Programmable Vision Accelerator (PVAs)—which may include one or more direct memory access (DMA) systems, one or more vision or vector processing units (VPUs), one or more pixel processing engines (PPEs), etc., Vision Processing Units (VPUs), Optical Flow Accelerators (OFAs), Field Programmable Gate Arrays (FPGAs), Neuromorphic Chips, Quantum Processing Units (QPUs), Associative Process Units (APUs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 710 may include one or more receivers, transmitters, and/or transceivers that allow the computing device 700 to communicate with other computing devices via an electronic communication network, included wired and/or wireless communications. The communication interface 710 may include components and functionality to allow communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 720 and/or communication interface 710 may include one or more data processing units (DPUs) to transmit data received over a network and/or through interconnect system 702 directly to (e.g., a memory of) one or more GPU(s) 708.

The I/O ports 712 may allow the computing device 700 to be logically coupled to other devices including the I/O components 714, the presentation component(s) 718, and/or other components, some of which may be built in to (e.g., integrated in) the computing device 700. Illustrative I/O components 714 include a microphone, mouse, keyboard, joystick, game pad, game controller, satellite dish, scanner, printer, wireless device, etc. The I/O components 714 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 700. The computing device 700 may be include depth cameras, such as stereoscopic camera systems, infrared camera systems, RGB camera systems, touchscreen technology, and combinations of these, for gesture detection and recognition. Additionally, the computing device 700 may include accelerometers or gyroscopes (e.g., as part of an inertia measurement unit (IMU)) that allow detection of motion. In some examples, the output of the accelerometers or gyroscopes may be used by the computing device 700 to render immersive augmented reality or virtual reality.

The power supply 716 may include a hard-wired power supply, a battery power supply, or a combination thereof. The power supply 716 may provide power to the computing device 700 to allow the components of the computing device 700 to operate.

The presentation component(s) 718 may include a display (e.g., a monitor, a touch screen, a television screen, a heads-up-display (HUD), other display types, or a combination thereof), speakers, and/or other presentation components. The presentation component(s) 718 may receive data from other components (e.g., the GPU(s) 708, the CPU(s) 706, DPUs, etc.), and output the data (e.g., as an image, video, sound, etc.).

Example Data Center

Figure 8:
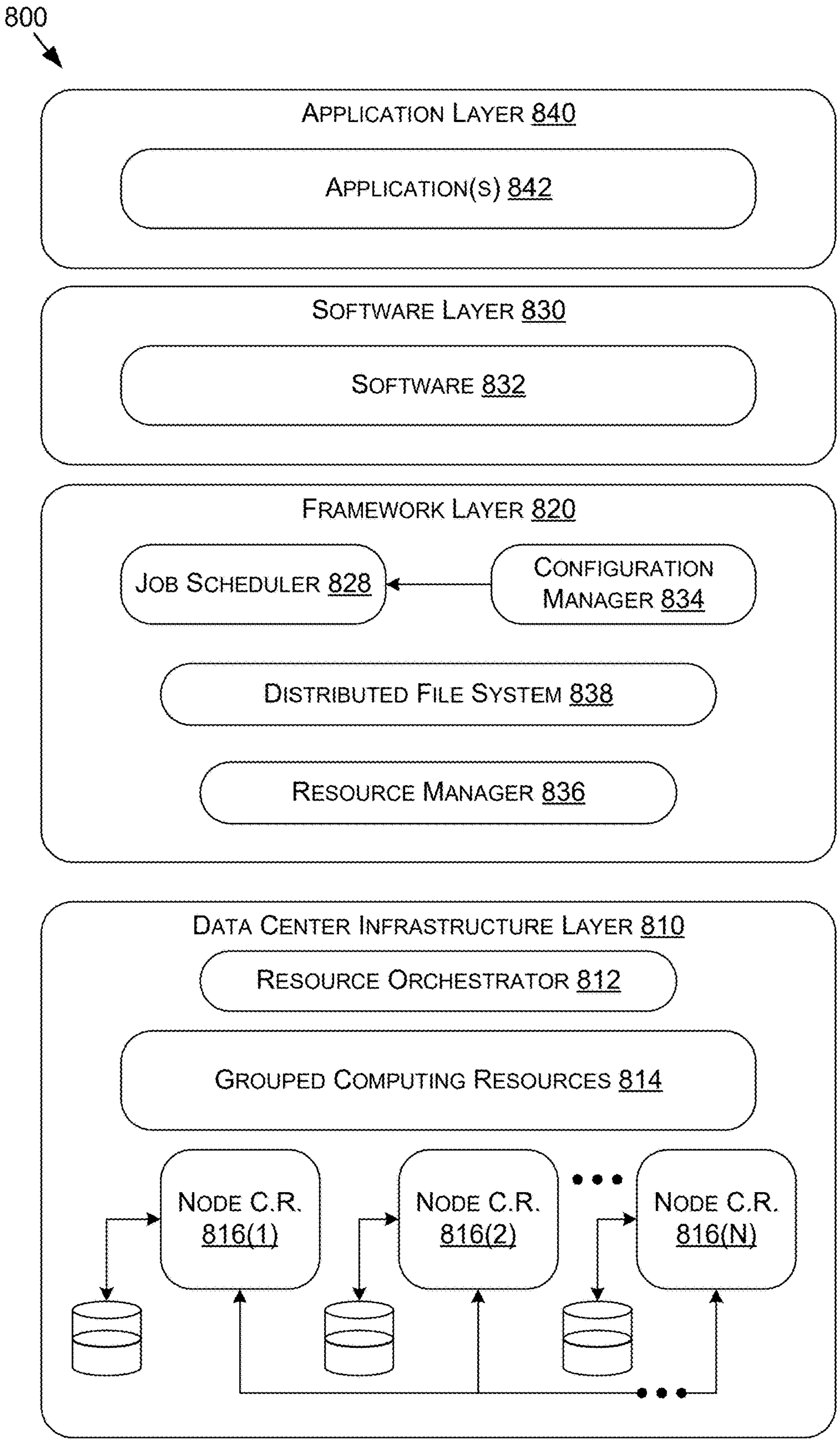
FIG. 8 is a block diagram of an example data center suitable for use in implementing some embodiments of the present disclosure.

FIG. 8 illustrates an example data center 800 that may be used in at least one embodiments of the present disclosure.

The data center 800 may include a data center infrastructure layer 810, a framework layer 820, a software layer 830, and/or an application layer 840.

As shown in FIG. 8, the data center infrastructure layer 810 may include a resource orchestrator 812, grouped computing resources 814, and node computing resources ("node C.R.s") 816(1)-816(N), where "N" represents any whole, positive integer. In at least one embodiment, node C.R.s 816(1)-816(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 816(1)-816(N) may correspond to a server having one or more of the above-mentioned computing resources. In addition, in some embodiments, the node C.R.s 816(1)-8161(N) may include one or more virtual components, such as vGPUs, vCPUs, and/or the like, and/or one or more of the node C.R.s 816(1)-816(N) may correspond to a virtual machine (VM).

In at least one embodiment, grouped computing resources 814 may include separate groupings of node C.R.s 816 housed within one or more racks (not shown), or many racks housed in data centers at various geographical locations (also not shown). Separate groupings of node C.R.s 816 within grouped computing resources 814 may include grouped compute, network, memory or storage resources that may be configured or allocated to support one or more workloads. In at least one embodiment, several node C.R.s 816 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 812 may configure or otherwise control one or more node C.R.s 816(1)-816(N) and/or grouped computing resources 814. In at least one embodiment, resource orchestrator 812 may include a software design infrastructure (SDI) management entity for the data center 800. The resource orchestrator 812 may include hardware, software, or some combination thereof.

In at least one embodiment, as shown in FIG. 8, framework layer 820 may include a job scheduler 828, a configuration manager 834, a resource manager 836, and/or a distributed file system 838. The framework layer 820 may include a framework to support software 832 of software layer 830 and/or one or more application(s) 842 of application layer 840. The software 832 or application(s) 842 may respectively include web-based service software or applications, such as those provided by Amazon Web Services, Google Cloud and Microsoft Azure. The framework layer 820 may be, but is not limited to, a type of free and open-source software web application framework such as Apache Spark™ (hereinafter "Spark") that may use distributed file system 838 for large-scale data processing (e.g., "big data"). In at least one embodiment, job scheduler 828 may include a Spark driver to facilitate scheduling of workloads supported by various layers of data center 800. The configuration manager 834 may be capable of configuring different layers such as software layer 830 and framework layer 820 including Spark and distributed file system 838 for supporting large-scale data processing. The resource manager 836 may be capable of managing clustered or grouped computing resources mapped to or allocated for support of distributed file system 838 and job scheduler 828. In at least one embodiment, clustered or grouped computing resources may include grouped computing resource 814 at data center infrastructure layer 810. The resource manager 836 may coordinate with resource orchestrator 812 to manage these mapped or allocated computing resources.

In at least one embodiment, software 832 included in software layer 830 may include software used by at least portions of node C.R.s 816(1)-816(N), grouped computing resources 814, and/or distributed file system 838 of framework layer 820. One or more types of software 832 may include, but are not limited to, Internet web page search software, e-mail virus scan software, database software, and streaming video content software. One or more types of software 832 may also, or instead, include data sourcing pipeline 122, data curation pipeline 124, and/or management engine 126.

In at least one embodiment, application(s) 842 included in application layer 840 may include one or more types of applications used by at least portions of node C.R.s 816(1)-816(N), grouped computing resources 814, and/or distributed file system 838 of framework layer 820. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 834, resource manager 836, and resource orchestrator 812 may implement any number and type of self-modifying actions based on any amount and type of data acquired in any technically feasible fashion. Self-modifying actions may relieve a data center operator of data center 800 from making possibly bad configuration decisions and possibly avoiding underutilized and/or poor performing portions of a data center.

The data center 800 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 800. In at least one embodiment, trained or deployed machine learning models corresponding to one or more neural networks may be used to infer or predict information using resources described above with respect to the data center 800 by using weight parameters calculated through one or more training techniques, such as but not limited to those described herein.

In at least one embodiment, the data center 800 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 700 of FIG. 7—e.g., each device may include similar components, features, and/or functionality of the computing device(s) 700. In addition, where backend devices (e.g., servers, NAS, etc.) are implemented, the backend devices may be included as part of a data center 800, an example of which is described in more detail herein with respect to FIG. 8.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 700 described herein with respect to FIG. 7. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

1. In some embodiments, a method comprises retrieving, by a plurality of processing nodes, a plurality of content items from one or more data sources, wherein each processing node of the plurality of processing nodes retrieves a different subset of the plurality of content items from the one or more data sources; applying a first set of filters to metadata associated with the plurality of content items to generate a plurality of filtered content items, wherein the first set of filters comprises a set of conditions associated with the metadata; generating, based on a subset of the metadata associated with the plurality of filtered content items and a second set of filters, a plurality of mappings between the plurality of filtered content items and a plurality of text descriptions for the plurality of filtered content items; and storing, based on the plurality of mappings, the plurality of filtered content items in association with the plurality of text descriptions in one or more data stores.
2. The method of clause 1, further comprising initializing the plurality of processing nodes using a set of retrieval criteria associated with the plurality of content items, wherein the set of retrieval criteria indicates, for each processing node included in the plurality of processing nodes, a subset of the plurality of content items to retrieve from the one or more data sources.
3. The method of any of clauses 1-2, wherein the set of retrieval criteria further specifies at least one of the one or more data sources, one or more types of content to be retrieved from the one or more data sources, or one or more types of the metadata to be retrieved from the one or more data sources.
4. The method of any of clauses 1-3, further comprising detecting an error associated with execution of a processing node included in the plurality of processing nodes; determining, based on a progress of the processing node in retrieving the subset of the plurality of content items, a remainder of the subset of the plurality of content items to be retrieved by the processing node; and reinitializing the processing node based on the remainder of the subset of the plurality of content items.
5. The method of any of clauses 1-4, wherein generating the plurality of mappings comprises generating, via execution of one or more machine learning models, a plurality of scores associated with at least one of the plurality of filtered content items or the plurality of text descriptions; and generating the plurality of mappings between the plurality of filtered content items and the plurality of text descriptions based on the second set of filters and the plurality of scores.

6. The method of any of clauses 1-5, wherein generating the plurality of mappings based on the second set of filters and the plurality of scores comprises applying a threshold corresponding to the second set of filters to a similarity score that corresponds to the plurality of scores, the similarity score being computed between (i) a first embedding of a content item included in the plurality of filtered content items and (ii) a second embedding of a text description for the content item that is included in the plurality of text descriptions; and in response to determining that the similarity score does not meet the threshold generating, via execution of an additional machine learning model, an additional text description of the content item; and generating a mapping between the content item and the additional text description.
7. The method of any of clauses 1-6, wherein generating the plurality of mappings based on the second set of filters and the plurality of scores comprises applying one or more thresholds corresponding to the second set of filters to (i) a first score for a content item included in the plurality of filtered content items and (ii) a second score for a text description of the content item that is included in the plurality of text descriptions; and in response to determining that the one or more thresholds are not met by at least one of the first score or the second score, omitting generation of a mapping between the content item and the text description.
8. The method of any of clauses 1-7, wherein the first set of filters comprises at least one of a keyword, a category, a deduplication filter, or a usage filter.
9. The method of any of clauses 1-8, wherein the plurality of content items comprises at least one of image content, audio, video, text, three-dimensional (3D) content, or multimodal content.
10. The method of any of clauses 1-9, wherein the plurality of text descriptions comprises (i) a first text description in a first language and (ii) a second text description in a second language.
11. In some embodiments, one or more processors comprise processing circuitry to perform operations comprising retrieving, by a plurality of processing nodes, a plurality of content items from one or more data sources, wherein each processing node of the plurality of processing nodes retrieves a different subset of the plurality of content items from the one or more data sources; applying a first set of filters to metadata associated with the plurality of content items to generate a plurality of filtered content items, wherein the first set of filters comprises a set of conditions associated with the metadata; generating, based on a subset of the metadata associated with the plurality of filtered content items and a second set of filters, a plurality of mappings between the plurality of filtered content items and a plurality of text descriptions for the plurality of filtered content items; and stores, based on the plurality of mappings, the plurality of filtered content items in association with the plurality of text descriptions in one or more data stores.
12. The one or more processors of clause 11, wherein applying the first set of filters comprises providing, as input to a machine learning model, a prompt that includes (i) a second subset of the metadata associated with a content item of the plurality of content items and (ii) an instruction to apply one or more filters of the first set of filters to the content item; and updating the plurality of filtered content items to include the content item based on output generated using the machine learning model in response to the prompt.
13. The one or more processors of any of clauses 11-12, wherein the prompt further includes the content item.
14. The one or more processors of any of clauses 11-13, wherein the operations further comprising determining a second subset of the metadata associated with a content item included in the plurality of content items based on at least one of (i) a webpage associated with the content item or (ii) a caption for the content item.
15. The one or more processors of any of clauses 11-14, wherein the operations further comprise updating one or more parameters of a machine learning model using the plurality of filtered content items and the plurality of text descriptions.
16. The one or more processors of any of clauses 11-15, wherein the second set of filters is associated with at least one of restricted content, inappropriate content, or a similarity between a content item included in the plurality of filtered content items and a corresponding text description included in the plurality of filtered content items.
17. The one or more processors of any of clauses 11-16, wherein the one or more data sources comprise at least one of an archive, a webpage, a website, a database, or a filesystem.
18. The one or more processors of any of clauses 11-17, wherein the one or more processors are comprised in at least one of a control system for an autonomous or semi-autonomous machine; a perception system for an autonomous or semi-autonomous machine; a system for performing simulation operations; a system for performing digital twin operations; a system for performing light transport simulation; a system for performing collaborative content creation for 3D assets; a system for performing deep learning operations; a system for performing remote operations; a system for performing real-time streaming; a system for generating or presenting one or more of augmented reality content, virtual reality content, or mixed reality content; a system implemented using an edge device; a system implemented using a robot; a system for performing conversational AI operations; a system implementing one or more multi-model language models; a system implementing one or more large language models (LLMs); a system implementing one or more vision language models (VLMs); a system for generating synthetic data; a system for generating synthetic data using AI; a system incorporating one or more virtual machines (VMs); a system implemented at least partially in a data center; or a system implemented at least partially using cloud computing resources.
19. In some embodiments, a system comprises a data center comprising a plurality of processing nodes, each processing node of the plurality of processing nodes being implemented with one or more processors to perform operations comprising retrieving, by the plurality of processing nodes, a plurality of content items from one or more data sources, wherein each processing node of the plurality of processing nodes retrieves a different subset of the plurality of content items from the one or more data sources; applying a first set of filters to metadata associated with the plurality of content items to generate a plurality of filtered content items, wherein the first set of filters comprises a set of conditions associated with the metadata; generating, based on a subset of the metadata associated with the plurality of filtered content items and a second set of filters, a plurality of mappings between the plurality of filtered content items and a plurality of descriptions for the plurality of filtered content items; and storing, based on the plurality of mappings, the plurality of filtered content items in association with the plurality of descriptions in one or more data stores.

20. The system of clause 19, wherein the system is comprised in at least one of a control system for an autonomous or semi-autonomous machine; a perception system for an autonomous or semi-autonomous machine; a system for performing simulation operations; a system for performing digital twin operations; a system for performing light transport simulation; a system for performing collaborative content creation for 3D assets; a system for performing deep learning operations; a system for performing remote operations; a system for performing real-time streaming; a system for generating or presenting one or more of augmented reality content, virtual reality content, or mixed reality content; a system implemented using an edge device; a system implemented using a robot; a system for performing conversational AI operations; a system implementing one or more multi-model language models; a system implementing one or more large language models (LLMs); a system implementing one or more vision language models (VLMs); a system for generating synthetic data; a system for generating synthetic data using AI; a system incorporating one or more virtual machines (VMs); a system implemented at least partially in a data center; or a system implemented at least partially using cloud computing resources.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Other variations are within spirit of present disclosure. Thus, while disclosed techniques are susceptible to various modifications and alternative constructions, certain illustrated embodiments thereof are shown in drawings and have been described herein in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. In at least one embodiment, use of term "set" (e.g., "a set of items") or "subset" unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, term "plurality" indicates a state of being plural (e.g., "a plurality of items" indicates multiple items). In at least one embodiment, number of items in a plurality is at least two, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. In at least one embodiment, set of non-transitory computer-readable storage media comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

In at least one embodiment, an arithmetic logic unit is a set of combinational logic circuitry that takes one or more inputs to produce a result. In at least one embodiment, an arithmetic logic unit is used by a processor to implement mathematical operation such as addition, subtraction, or multiplication. In at least one embodiment, an arithmetic logic unit is used to implement logical operations such as logical AND/OR or XOR. In at least one embodiment, an arithmetic logic unit is stateless, and made from physical switching components such as semiconductor transistors arranged to form logical gates. In at least one embodiment, an arithmetic logic unit may operate internally as a stateful logic circuit with an associated clock. In at least one embodiment, an arithmetic logic unit may be constructed as an asynchronous logic circuit with an internal state not maintained in an associated register set. In at least one embodiment, an arithmetic logic unit is used by a processor to combine operands stored in one or more registers of the processor and produce an output that can be stored by the processor in another register or a memory location.

In at least one embodiment, as a result of processing an instruction retrieved by the processor, the processor presents one or more inputs or operands to an arithmetic logic unit, causing the arithmetic logic unit to produce a result based at least in part on an instruction code provided to inputs of the arithmetic logic unit. In at least one embodiment, the instruction codes provided by the processor to the ALU are based at least in part on the instruction executed by the processor. In at least one embodiment combinational logic in the ALU processes the inputs and produces an output which is placed on a bus within the processor. In at least one embodiment, the processor selects a destination register, memory location, output device, or output storage location on the output bus so that clocking the processor causes the results produced by the ALU to be sent to the desired location.

In the scope of this application, the term arithmetic logic unit, or ALU, is used to refer to any computational logic circuit that processes operands to produce a result. For example, in the present document, the term ALU can refer to a floating-point unit, a DSP, a tensor core, a shader core, a coprocessor, or a CPU.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously, or intermittently. In at least one embodiment, terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. In at least one embodiment, process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or interprocess communication mechanism.

Although descriptions herein set forth example implementations of described techniques, other architectures may be used to implement described functionality, and are intended to be within scope of this disclosure. Furthermore, although specific distributions of responsibilities may be defined above for purposes of description, various functions and responsibilities might be distributed and divided in different ways, depending on circumstances.

What is claimed is:

1. A method comprising:

retrieving, by a plurality of processing nodes, a plurality of content items from one or more data sources, wherein each processing node of the plurality of processing nodes retrieves a different subset of the plurality of content items from the one or more data sources;

applying a first set of filters to metadata associated with the plurality of content items to generate a plurality of filtered content items, wherein the first set of filters comprises a set of conditions associated with the metadata;

generating similarity scores respectively between content embeddings of content items in the plurality of filtered content items and label embeddings of respective text descriptions for the plurality of filtered content items;

generating, based on the generated similarity scores and a second set of filters implementing at least a threshold similarity score, a plurality of mappings between the plurality of filtered content items and a plurality of text descriptions for the plurality of filtered content items;

storing, based on the plurality of mappings, the plurality of filtered content items in respective association with the plurality of text descriptions, as a curated dataset in one or more data stores; and causing one or more parameters of a machine learning model to be updated using the curated dataset.

2. The method of claim 1, further comprising initializing the plurality of processing nodes using a set of retrieval criteria associated with the plurality of content items, wherein the set of retrieval criteria indicates, for each processing node included in the plurality of processing nodes, a subset of the plurality of content items to retrieve from the one or more data sources.

3. The method of claim 2, wherein the set of retrieval criteria further specifies at least one of the one or more data sources, one or more types of content to be retrieved from the one or more data sources, or one or more types of the metadata associated with the plurality of content items.

4. The method of claim 2, further comprising:

detecting an error associated with execution of a processing node included in the plurality of processing nodes;

determining, based on a progress of the processing node in retrieving the subset of the plurality of content items, a remainder of the subset of the plurality of content items to be retrieved by the processing node; and reinitializing the processing node based on the remainder of the subset of the plurality of content items.

5. The method of claim 1, wherein generating the plurality of mappings comprises:

applying a threshold corresponding to the second set of filters to a similarity score, the similarity score being computed between (i) a first embedding of a content item included in the plurality of filtered content items and (ii) a second embedding of a text description for the content item that is included in the plurality of text descriptions; and in response to determining that the similarity score does not meet the threshold:

generating, via execution of an additional machine learning model, an additional text description of the content item; and generating a mapping between the content item and the additional text description.

6. The method of claim 1, wherein generating the plurality of mappings comprises:

applying one or more thresholds corresponding to the second set of filters to (i) a first score for a content item included in the plurality of filtered content items and (ii) a second score for a text description of the content item that is included in the plurality of text descriptions; and in response to determining that the one or more thresholds are not met by at least one of the first score or the second score, omitting generation of a mapping between the content item and the text description.

7. The method of claim 1, wherein the first set of filters comprises at least one of a keyword, a category, a deduplication filter, or a usage filter.

8. The method of claim 1, wherein the plurality of content items comprises at least one of image content, audio, video, text, three-dimensional (3D) content, or multimodal content.

9. The method of claim 1, wherein the plurality of text descriptions comprises (i) a first text description in a first language and (ii) a second text description in a second language.

10. One or more processors coupled to a memory, the one or more processors comprising processing circuitry to perform operations comprising:

retrieving, by a plurality of processing nodes, a plurality of content items from one or more data sources, wherein each processing node of the plurality of processing nodes retrieves a different subset of the plurality of content items from the one or more data sources;

applying a first set of filters to metadata associated with the plurality of content items to generate a plurality of filtered content items, wherein the first set of filters comprises a set of conditions associated with the metadata;

generating similarity scores respectively between content embeddings of content items in the plurality of filtered content items and label embeddings of respective text descriptions for the plurality of filtered content items;

generating, based on the generated similarity scores and a second set of filters implementing at least a threshold similarity score, a plurality of mappings between the plurality of filtered content items and a plurality of text descriptions for the plurality of filtered content items;

storing, based on the plurality of mappings, the plurality of filtered content items in respective association with the plurality of text descriptions, as a curated dataset in one or more data stores; and causing one or more parameters of a machine learning model to be updated using the curated dataset.

11. The one or more processors of claim 10, wherein applying the first set of filters comprises:

providing, as input to a machine learning model, a prompt that includes (i) a second subset of the metadata associated with a content item of the plurality of content items and (ii) an instruction to apply one or more filters of the first set of filters to the content item; and updating the plurality of filtered content items to include the content item based on output generated using the machine learning model in response to the prompt.

12. The one or more processors of claim 11, wherein the prompt further includes the content item.

13. The one or more processors of claim 10, wherein the operations further comprising determining a second subset of the metadata associated with a content item included in the plurality of content items based on at least one of (i) a webpage associated with the content item or (ii) a caption for the content item.

14. The one or more processors of claim 10, wherein the operations further comprise updating one or more parameters of a machine learning model using the plurality of filtered content items and the plurality of text descriptions.

15. The one or more processors of claim 10, wherein the second set of filters is associated with at least one of restricted content, inappropriate content, or a similarity between a content item included in the plurality of filtered content items and a corresponding text description included in the plurality of filtered content items.

16. The one or more processors of claim 10, wherein the one or more data sources comprise at least one of an archive, a webpage, a website, a database, or a filesystem.

17. The one or more processors of claim 10, wherein the one or more processors are comprised in at least one of:

a control system for an autonomous or semi-autonomous machine;

a perception system for an autonomous or semi-autonomous machine;

a system for performing simulation operations;

a system for performing digital twin operations;

a system for performing light transport simulation;

a system for performing collaborative content creation for 3D assets;

a system for performing deep learning operations;

a system for performing remote operations;

a system for performing real-time streaming;

a system for generating or presenting one or more of augmented reality content, virtual reality content, or mixed reality content;

a system implemented using an edge device;

a system implemented using a robot;

a system for performing conversational AI operations;

a system implementing one or more multi-model language models;

a system implementing one or more large language models (LLMs);

a system implementing one or more vision language models (VLMs);

a system for generating synthetic data;

a system for generating synthetic data using AI;

a system incorporating one or more virtual machines (VMs);

a system implemented at least partially in a data center; or a system implemented at least partially using cloud computing resources.

18. A system comprising:

a data center comprising a plurality of processing nodes, each processing node of the plurality of processing nodes being implemented with one or more processors coupled to a memory to perform operations comprising:

retrieving, by the plurality of processing nodes, a plurality of content items from one or more data sources, wherein each processing node of the plurality of processing nodes retrieves a different subset of the plurality of content items from the one or more data sources;

applying a first set of filters to metadata associated with the plurality of content items to generate a plurality of filtered content items, wherein the first set of filters comprises a set of conditions associated with the metadata;

generating similarity scores respectively between content embeddings of content items in the plurality of filtered content items and label embeddings of respective text descriptions for the plurality of filtered content items;

generating, based on the generated similarity scores and a second set of filters implementing at least a threshold similarity score, a plurality of mappings between the plurality of filtered content items and a plurality of text descriptions for the plurality of filtered content items;

storing, based on the plurality of mappings, the plurality of filtered content items in respective association with the plurality of text descriptions, as a curated dataset in one or more data stores; and causing one or more parameters of a machine learning model to be updated using the curated dataset.

19. The system of claim 18, wherein the system is comprised in at least one of:

a control system for an autonomous or semi-autonomous machine;

a perception system for an autonomous or semi-autonomous machine;

a system for performing simulation operations;

a system for performing digital twin operations;

a system for performing light transport simulation;

a system for performing collaborative content creation for 3D assets;

a system for performing deep learning operations;

a system for performing remote operations;

a system for performing real-time streaming;

a system for generating or presenting one or more of augmented reality content, virtual reality content, or mixed reality content;

a system implemented using an edge device;

a system implemented using a robot;

a system for performing conversational AI operations;

a system implementing one or more multi-model language models;

a system implementing one or more large language models (LLMs);

a system implementing one or more vision language models (VLMs);

a system for generating synthetic data;

a system for generating synthetic data using AI;

a system incorporating one or more virtual machines (VMs);

a system implemented at least partially in a data center; or a system implemented at least partially using cloud computing resources.

* * * * *